(12) United States Patent
Park et al.

(10) Patent No.: US 7,446,703 B2
(45) Date of Patent: Nov. 4, 2008

(54) APPARATUS AND METHOD FOR RECEIVING GPS SIGNALS IN A MOBILE TERMINAL

(75) Inventors: Chan-Woo Park, Seoul (KR); Jeong-Bok Yang, Suwon-si (KR); Sun Choi, Seoul (KR); Ki-Hyun Park, Suwon-si (KR); Tae-Il Eom, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 96 days.

(21) Appl. No.: 11/407,923

(22) Filed: Apr. 21, 2006

(65) Prior Publication Data

US 2006/0250302 A1  Nov. 9, 2006

(30) Foreign Application Priority Data

May 3, 2005  (KR) .................. 10-2005-0037301

(51) Int. Cl.
  *G01S 1/00*  (2006.01)
(52) U.S. Cl. ................................. 342/357.09
(58) Field of Classification Search ................
  342/357.01–357.17
  See application file for complete search history.

(56) References Cited

U.S. PATENT DOCUMENTS

| 5,977,909 | A  | * | 11/1999 | Harrison et al. | ........ 342/357.09 |
| 6,346,911 | B1 | * | 2/2002  | King            | ........ 342/357.06 |
| 6,429,811 | B1 | * | 8/2002  | Zhao et al.     | ........ 342/357.09 |
| 6,788,249 | B1 | * | 9/2004  | Farmer et al.   | ........ 342/357.12 |

\* cited by examiner

*Primary Examiner*—Thomas H Tarcza
*Assistant Examiner*—Nga X Nguyen
(74) *Attorney, Agent, or Firm*—Roylance, Abrams, Berdo & Goodman, LLP

(57) ABSTRACT

An apparatus and method is provided for increasing GPS reception sensitivity in a mobile terminal having a mobile-based GPS positioning function. A GPS receiver in the mobile terminal generates SA data by using basic information about GPS satellites and system time. Here, the SA data is a replica of the total information bits of navigation data. The GPS receiver then correlates a PRN code with a GPS signal and coherent-integrating the correlation result by using the SA data. It calculates a position solution of the mobile terminal by using the integrated samples.

18 Claims, 27 Drawing Sheets

APPARATUS AND METHOD FOR RECEIVING GPS SIGNALS IN A MOBILE TERMINAL

PRIORITY

This application claims the benefit under 35 U.S.C. § 119(a) of a Korean Patent Application entitled "Apparatus and Method for Receiving GPS Signals in a Mobile Terminal", filed in the Korean Intellectual Property Office on May 3, 2005, and assigned Serial No. 2005-37301, the entire contents of which are hereby incorporated by reference.

BACKGROUND OF THE INVENTION

1. Field of the Invention

The present invention relates to a Global Positioning System (GPS). In particular, the present invention relates to an apparatus and method for improving GPS reception sensitivity in a mobile terminal with a mobile-based GPS positioning function.

2. Description of the Related Art

Modern society's development is a driving force for drastic growth in personal portable communications and provisioning of various additional services. In some countries, mobile terminals are equipped with a Global Positioning System (GPS) and positioning information-related services are provided to the mobile terminals. Many GPS satellites broadcast their ephemerides and system time, while circling the earth in predetermined orbits, so that a GPS receiver can determine its location. A GPS receiver in a mobile terminal determines accurate time and its location by calculating relative time of arrivals of GPS signals simultaneously transmitted by four or more GPS satellites.

GPS-based positioning is a process of measuring time delays of signals from the satellites and calculating the current position by using the time delays and the distances to the orbits of the satellites. When the distance to a first satellite is known, the GPS receiver's position is somewhere on the surface of a sphere with a radius equal to the distance, centered on the first satellite. When the distance to a second satellite is known, the GPS receiver's position is somewhere on the circle formed by the intersection of the sphere centered on the first satellite and the sphere centered on the second satellite. Using the distance to a third satellite, the third satellite results in a sphere that intersects this circle at two points. The GPS receiver's position is one of these two points. The distance to a satellite measured by the GPS receiver is referred to as a pseudo-range because it is a time-error biased distance measurement having a time error-caused distance error added to a true distance calculated by using the time it takes for the signal to travel from the satellite to the GPS receiver. Therefore, the GPS receiver eliminates the time error by using the distance to a fourth satellite.

GPS positioning often takes several minutes. This time consumption is not acceptable especially to a small-size GPS receiver provided in a mobile terminal with a limited battery life. Thus, some GPS receivers receive basic information necessary for satellite search from a nearby Assisted GPS (AGPS) server, such as a Position Determination Entity (PDE) server. The basic information is provided to mobile terminals by a base station in a network that serves the mobile terminals. For example, a synchronous Code Division Multiple Access (CDMA) radio network supports IS-801 as a message protocol between a mobile terminal and the PDE server, for a location-based service.

GPS-based positioning services are as follows.

1. Mobile-Assisted Positioning

The mobile-assisted positioning is the most popular positioning service defined by IS-801. The PDE server provides the mobile terminal with Acquisition Assistance (AA) data and Sensitivity Assistance (SA) data as information needed for positioning. The mobile terminal measures the pseudo-ranges to satellites by the shortest GPS operation based on the AA data and the SA data. The PDE server receives the pseudo-range measurements from the mobile terminal over a radio network and calculates the position solution of the mobile terminal.

The mobile-assisted positioning technology is useful for the case where the network detects the position of the mobile terminal, as in the E911 service. However, because one position solution is obtained at one time in the positioning service, it is not applicable to the case where continuous mobile position solutions are needed, like navigation.

2. Mobile-Based Positioning

Compared to mobile-assisted positioning, in the mobile-based positioning technology, the mobile terminal receives the ephemerides of satellites, almanac data, and its coarse position information from the PDE server, generates AA data, and calculates the position solution based on the pseudo-ranges to the satellites measured by using the AA data. Despite the shortcoming of GPS operation complexity, the mobile-based positioning is suitable for the case where the position solution must be continuously calculated.

The SA data refers to data that the mobile terminal selectively requests to the PDE server and receives from the PDE server in the mobile-assisted positioning service. The SA data comprises about 10 seconds of GPS navigation information bits. The use of the information bits increases a coherent integration time, thereby improving GPS reception sensitivity.

If the position solution is continuously calculated in the mobile-based positioning service, the GPS operation continues for a long time in most cases. The 10 seconds of SA data transmitted from the PDE server to the mobile terminal does not provide sufficient information bits, and thus is not available in the mobile-based positioning service. However, the absence of the navigation information bits restricts the increase of coherent integration time. Thus, the mobile terminal fails to acquire or misses satellite signals. In other words, the GPS reception sensitivity is decreased.

FIG. 1 is a block diagram illustrating a conventional mobile-based GPS receiver. Referring to FIG. 1, a GPS satellite 102 transmits a GPS signal by two carriers for standard positioning and precise positioning, L1 and L2. The GPS signal reaches a mobile terminal 142 and a PDE server 104. The PDE server 104 acquires ephemeris data comprising satellite orbit information such as the current position and speed of the GPS satellite 102, almanac data, and a coarse position solution by demodulating the GPS signal, and generates basic information based on those data. The basic information is provided to a base station 108 that covers a cell in which the mobile terminal 142 is located through a mobile switching center (MSC) 106 in a CDMA network 144. The base station 108 in turn transmits the basic information to the mobile terminal 142 by a CDMA signal.

In the mobile terminal 142, an antenna 110 receives radio frequency (RF) signals from the GPS satellite 102 and the CDMA base station 108. A duplexer 112 transfers the RF signals to a CDMA RF receiver 114 and a GPS RF receiver 118. The CDMA RF receiver 114 extracts the CDMA signal from the RF signals. A CDMA baseband processor 116 acquires the basic information transmitted by the PDE server 104 and system time information transmitted by the CDMA network 144 by demodulating and decoding the CDMA signal. A Temperature-Compensated Crystal Oscillator (TCXO) 120 provides a reference clock signal to the CDMA RF receiver 114, the GPS RF receiver 118, and a GPS baseband processor 122, in synchronization to the acquired system time.

The GPS RF receiver 118 extracts the GPS signal from the RF signals. The GPS signal is provided to a mixer 130 in the GPS baseband processor 122. A carrier Numerically Controlled Oscillator (NCO) 124 in the GPS baseband processor 122 generates a carrier frequency signal for the GPS signal in synchronization to the reference clock signal received from the TCXO 120. Similarly, a code NCO 126 generates a code frequency signal in synchronization to the reference clock signal. A code generator 128 generates the Pseudo-Random Noise (PRN) code of the GPS satellite 102 according to the code frequency signal.

The mixer 130 generates a baseband signal by mixing the GPS signal with the carrier frequency signal. A correlator 132 receives the baseband signal and the PRN code. The GPS baseband processor 122 generates AA data by using the basic information, creates a replica of the true GPS signal from the GPS satellite 102 by using the AA data, and correlates the replica signal with the true GPS signal through the correlator 132. That is, the correlator 132 correlates the GPS signal received from the mixer 130 with the replica signal by using the PRN code. The correlator 132 integrates the correlation result for a predetermined coherent integration time, for example, 1 millisecond and then outputs correlation samples.

A memory 134 stores the correlation samples. A peak detector 136 detects samples having peak energy equal to or greater than a predetermined threshold among the stored samples. A pseudo-range measurer 138 calculates the pseudo-range to the GPS satellite 102 using the detected samples. A position solution calculator 140 calculates the position solution of the mobile terminal 142 using pseudo-range measurements to at least four GPS satellites and ephemeris data provided in the basic information.

As stated before, SA data is data that the PDE server 104 transmits to the mobile terminal 142 in order to increase GPS reception sensitivity in mobile-assisted positioning. The SA data contains information bits of GPS navigation data that the mobile terminal 142 is to receive. The information bits of the navigation data are known by the SA data, thereby increasing the coherent integration time. Without the SA data, the mobile terminal 142 can perform an integration within 20 milliseconds which is the duration of one data unit. With the SA data, the coherent integration time can be increased to 60 to 100 milliseconds. In the case of a long time coherent integration, the use of the SA data increases the GPS reception sensitivity by 2 to 3 dB, relative to non-use of the SA data.

Unlike mobile-assisted positioning, in the mobile-based positioning, the SA data is not provided from the PDE server 104 to the mobile terminal 142. Even though the mobile terminal 142 receives the SA data by requesting it from the PDE server 104, the SA data is effective for only about 10 seconds and thus is not suitable for the mobile-based positioning which requires continuous computation of the position solution of the mobile terminal 142. In the conventional mobile-based positioning, therefore, due to the absence of SA data, a coherent integration does not last 20 milliseconds or longer. Consequently, a decrease by 2 to 3-dB in sensitivity is observed, compared to mobile-assisted positioning. The sensitivity decrease is a big problem for mobile-based positioning in GPS navigation applications for mobile terminals.

SUMMARY OF THE INVENTION

An object of the present invention is to substantially solve at least the above problems and/or disadvantages and to provide at least the advantages described below. Accordingly, an object of the present invention is to provide an apparatus and method for generating Sensitivity Assistance (SA) data by estimating information bits of navigation data as much as possible in a mobile terminal.

Another object of the present invention is to provide an apparatus and method for increasing GPS reception sensitivity by using generated SA data, which is similar to true SA data, without receiving additional data in a mobile terminal.

The above objects are achieved by providing an apparatus and method for increasing GPS reception sensitivity in a mobile terminal having a mobile-based GPS positioning function.

According to one aspect of the present invention, in an apparatus for receiving GPS signals in a mobile terminal, a first RF receiver receives a first RF signal comprising basic information about a GPS satellite over a mobile communication network. A first baseband processor acquires the basic information and system time of the mobile communication network based on the output of the first RF receiver. A second RF receiver receives a second RF signal comprising navigation data from the GPS satellite. A navigation data bit estimator generates SA data by using the basic information and the system time. The SA data is a replica of the total information bits of the navigation data. A second baseband processor generates integrated samples by correlating a PRN code with the second RF signal and coherent-integrating the correlation result by using the SA data. A signal detector calculates a position solution of the mobile terminal by using the integrated samples received from the second baseband processor.

According to another aspect of the present invention, in a method of receiving GPS signals in a mobile terminal, a first RF signal comprising basic information about a GPS satellite is received at a first RF receiver over a mobile communication network. The basic information and the system time of the mobile communication network are acquired based on the output of the first RF receiver. A second RF signal comprising navigation data is received from the GPS satellite. SA data, which is a replica of the total information bits of the navigation data, which is generated by using the basic information and the system time. A PRN code is correlated with the second RF signal and coherent-integrated result by using the SA data. A position solution of the mobile terminal is calculated by using the integrated samples.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE EXEMPLARY EMBODIMENTS

Exemplary embodiments of the present invention will be described herein below with reference to the accompanying drawings. In the following description, well-known functions or constructions are omitted for clarity and conciseness.

Embodiments of the present invention generate Sensitivity Assistance (SA) data as used in mobile-assisted positioning by estimating the total information bits of Global Positioning System (GPS) navigation data using basic information received from a Position Determination Entity (PDE) server over a mobile communication network, such as ephemeris data, almanac data, and Code Division Multiple Access (CDMA) system time in a mobile terminal equipped with a GPS receiver.

Like Acquisition Assistance (AA) data, the SA data is used to facilitate acquisition and tracking of GPS signals in a GPS system.

The AA data refers to data that the PDE server transmits to the mobile terminal to facilitate initial signal acquisition. For example, the AA data contains a satellite code and Doppler frequency search position and range. The GPS receiver searches the code and Doppler range indicated by the AA data rather than searching all possible codes and Doppler ranges. Without the AA data, a maximum code search period is +/−512 chips and a maximum Doppler search range is +/−4000 Hz. If the code search period established in the AA data is +/−15 chips, the time period that the GPS receiver is assumed to search is reduced and thus a signal acquisition time can be decreased.

The SA data is an estimate of 50 bps (bits/sec) of navigation data. Unlike the AA data that tells the search position and range, the SA data is used in the case where coherent integration takes place over a long period of 20 milliseconds or more. With the SA data, the effects (+ or −) of code-modulated navigation data can be eliminated, thereby avoiding compensation involved in the long coherent integration. Therefore, sensitivity is increased.

Figure 1:
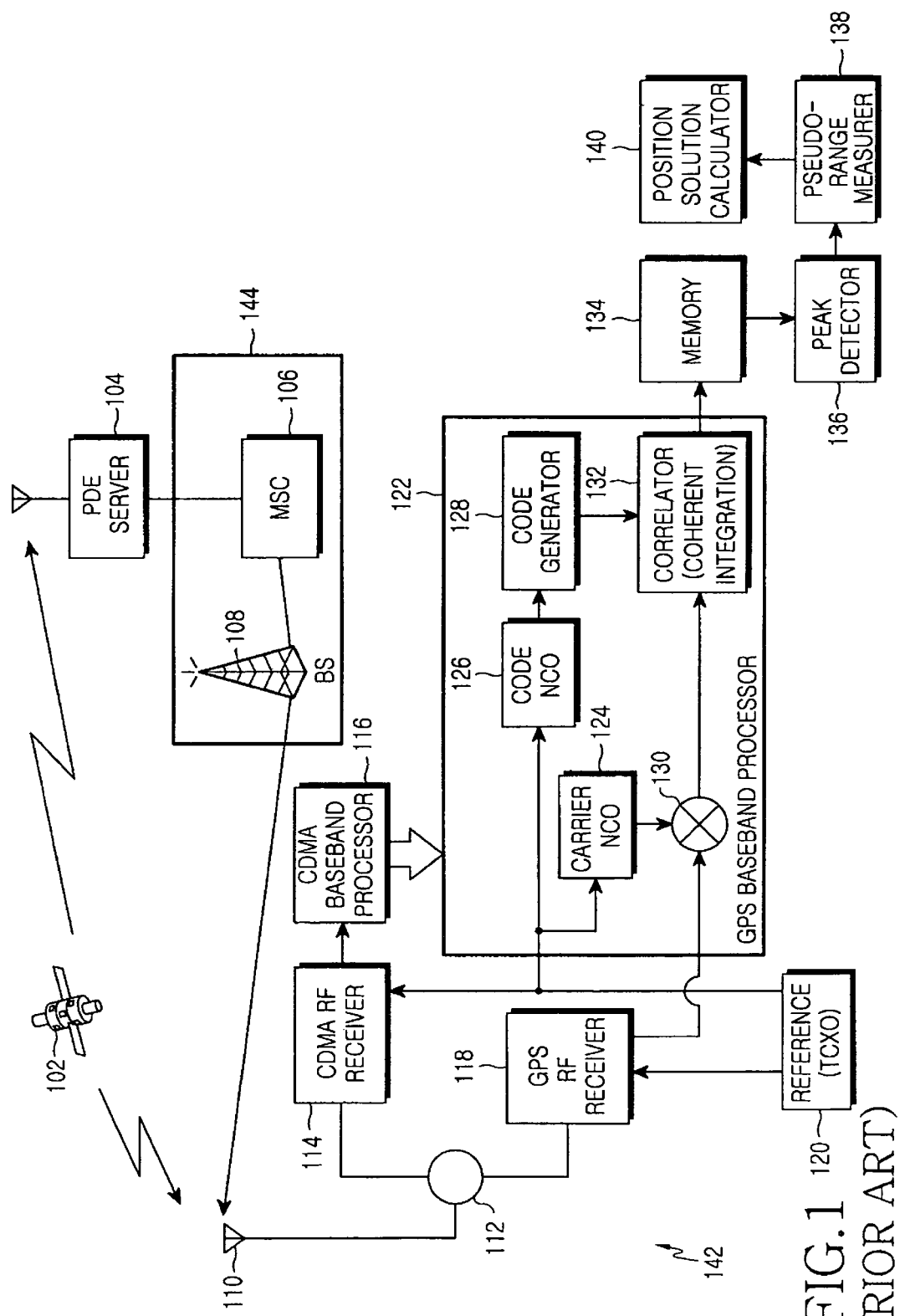
FIG. 1 is a block diagram illustrating a conventional mobile-based Global Positioning System (GPS) receiver.
Figure 2A:
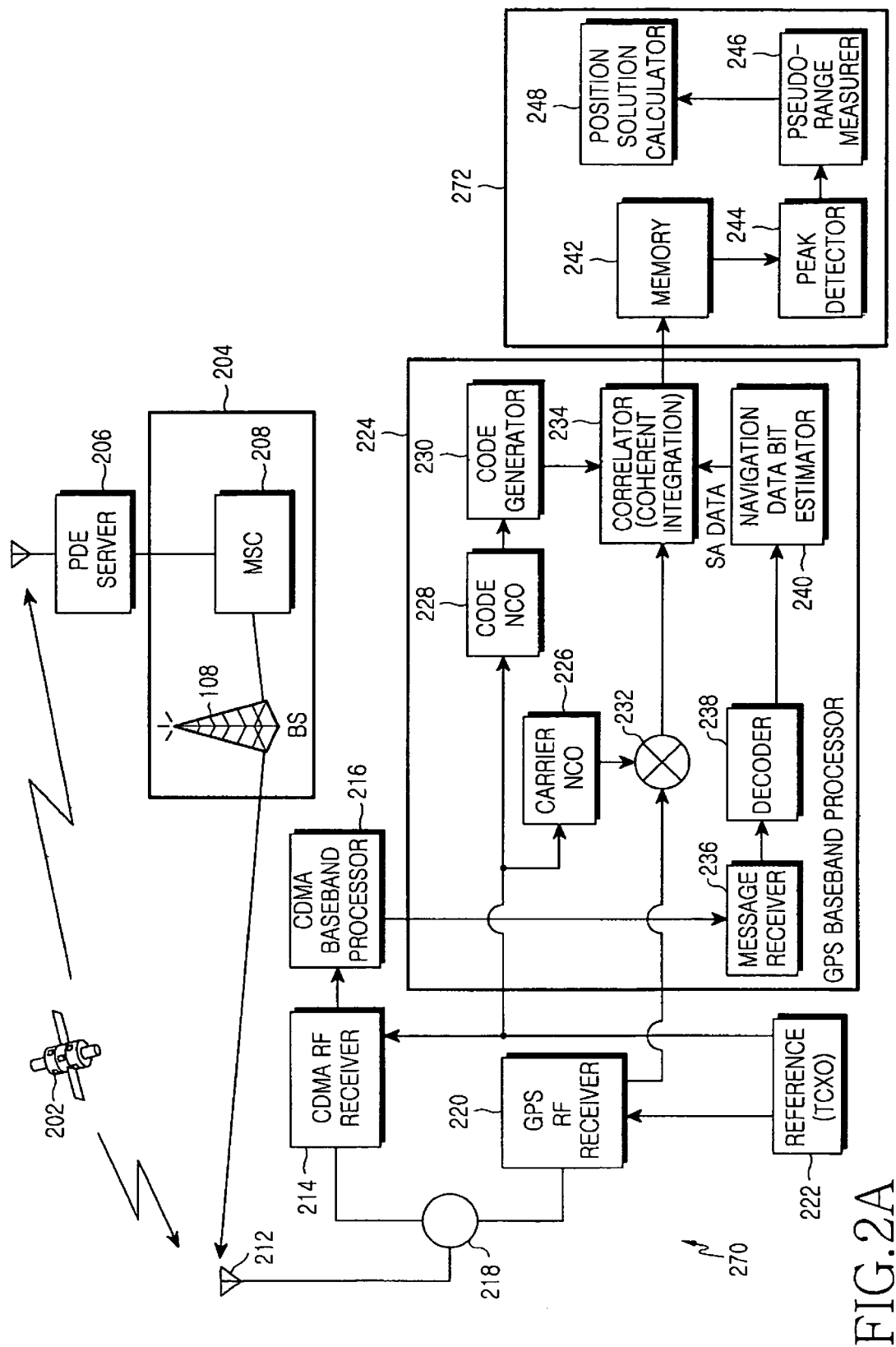
FIG. 2A is a block diagram illustrating a mobile-based GPS receiver according to an exemplary embodiment of the present invention.

FIG. 2A is a block diagram illustrating a mobile-based GPS receiver according to an exemplary embodiment of the present invention.

Referring to FIG. 2A, a GPS satellite 202 transmits a GPS signal by two carriers for standard positioning and precise positioning, L1 and L2. The GPS signal reaches a mobile terminal 270 and a PDE server 206. The PDE server 206 acquires ephemeris data comprising satellite orbit information such as the current position and speed of the GPS satellite 202, almanac data, and a coarse position solution by demodulating the GPS signal, and generates basic information based on the acquired data. The basic information is provided to a base station 108 that covers a cell in which the mobile terminal 270 is located through a MSC 208 in a CDMA network 204. The base station 108 in turn transmits the basic information to the mobile terminal 270 by a CDMA signal.

In the mobile terminal 270, an antenna 212 receives RF signals from the GPS satellite 202 and the CDMA base station 108. A duplexer 218 transfers the RF signals to a CDMA RF receiver 214 and a GPS RF receiver 220. The CDMA RF receiver 214 extracts the CDMA signal from the RF signals. A CDMA baseband processor 216 acquires the basic information from the PDE server 206 and system time information from the CDMA network 204 by demodulating and decoding the CDMA signal. A Temperature-Compensated Crystal Oscillator (TCXO) 222 provides a reference clock signal to the CDMA RF receiver 214, the GPS RF receiver 220, and a GPS baseband processor 224 in synchronization to the acquired system time.

The GPS RF receiver 220 extracts the GPS signal from the RF signals. The GPS signal is provided to a mixer 232 in the GPS baseband processor 224. The GPS baseband processor 224 comprises the mixer 232, a carrier Numerically Controlled Oscillator (NCO) 226, a code NCO 228, a code generator 230, and a correlator & coherent integrator 234. The GPS baseband processor 224 further comprises a message receiver 236 and a decoder 238. A navigation data bit estimator 240 for generating SA data by using the basic information is incorporated into the GPS baseband processor 224 or can also be separately configured.

The carrier NCO 226 generates a carrier frequency signal for the GPS signal in synchronization to the reference clock signal received from the TCXO 222. Similarly, the code NCO 228 generates a code frequency signal in synchronization to the reference clock signal. The code generator 230 generates the PRN code of the GPS satellite 202 according to the code frequency signal. The mixer 232 generates a baseband signal by mixing the GPS signal with the carrier frequency signal. The correlator & coherent integrator 234 receives the baseband signal and the PRN code.

In the mean time, the message receiver 236 receives a message comprising basic information and the CDMA system time information from the CDMA baseband processor 216 in an IS-801 format. The decoder 238 acquires the basic information comprising ephemeris data and almanac data by decoding the message. The navigation data bit estimator 240 generates a replica of total navigation data transmitted from the GPS satellite 202 as SA data. The operation of the navigation data bit estimator 240 will be described in greater detail later with reference to FIG. 2B.

The correlator & coherent integrator 234 correlates the baseband signal from the PRN code, integrates the correlation result for a predetermined coherent integration time period, and then outputs integrated samples. The coherent integration time can be determined according to the length of a reliable part of the SA data.

To be more specific about the operation of the correlator & coherent integrator 234, the correlator & coherent integrator 234 comprises a correlator for multiplying the baseband signal by the PRN code (that is, a local replica of the true PRN code), and a coherent integrator. The correlator & coherent integrator 234 multiplies the input baseband signal from the mixer 232 by the PRN code received from the code generator 230, integrates the product, and determines whether the integrated correlation exceeds a predetermined threshold. If the PRN code is different from the true PRN code of the baseband signal, the product is a very small value, not exceeding the threshold. Therefore, the original signal cannot be recovered. The coherent integrator integrates the correlation result, compensating each bit of the correlation result by using the polarity of each bit of the SA data, thereby creating coherent integrated samples.

The coherent integrated samples are stored in a memory 242 in a signal detector 272, to be used in calculation of a position solution. The signal detector 272 comprises memory 242, a peak detector 244, a pseudo-range measurer 246, and a position solution calculator 248. The peak detector 244 detects samples having peak energy equal to or greater than a predetermined threshold among the stored samples. The pseudo-range measurer 246 calculates the pseudo-range to the GPS satellite 202 by using the detected samples. The position solution calculator 246 calculates the position solution of the mobile terminal 272 using pseudo-range measurements to at least four GPS satellites and ephemeris data included in the basic information.

Figure 3:
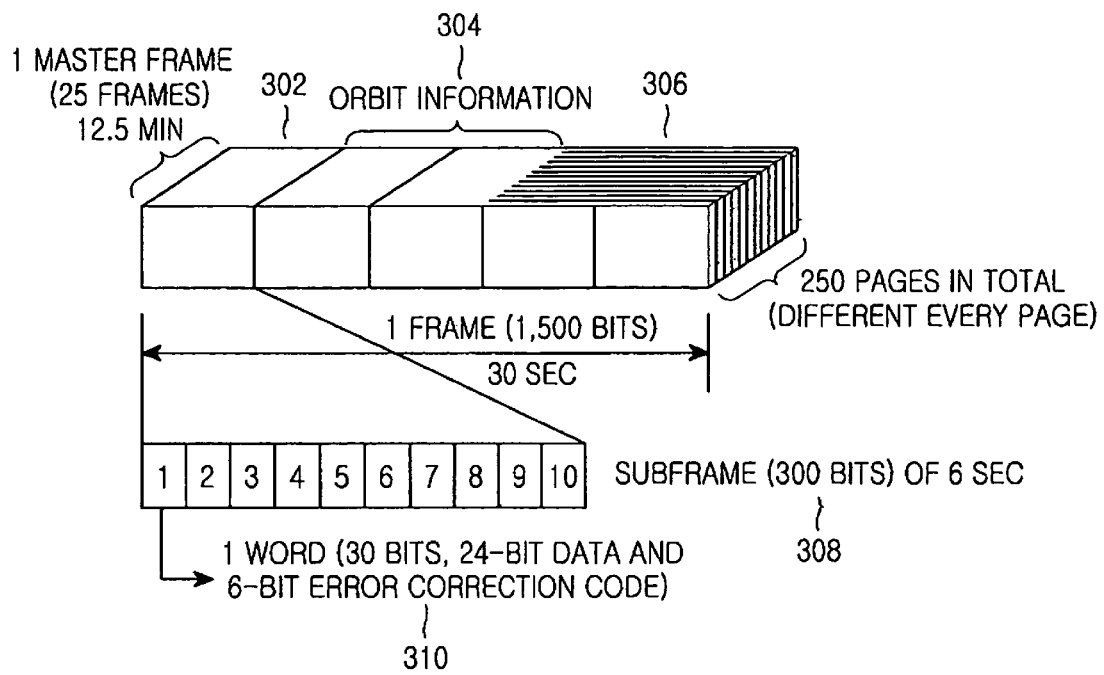
FIG. 3 illustrates the structure of navigation data.

The basic information decoded by the decoder 238 is in the form of the information bits of navigation data transmitted by the GPS satellite 202. FIG. 3 illustrates the structure of the navigation data.

Referring to FIG. 3, one frame of navigation data is organized into 25 pages of 5 subframes. Information about a satellite clock and a satellite orbit are repeated in first three subframes 302 and 304 every page. Fourth and fifth subframes 306 provide information about an individual satellite's history or its health status, such as almanac data or ionospheric correction parameters. These subframes 306 change every page. Each subframe has 300 bits, and lasts 6 seconds in duration. Therefore, it takes 12.5 minutes to collect the total navigation message from the GPS satellite 202.

Each subframe 308 comprises 10 words, each word 310 including 30-bit information, specifically 24-bit data and 6-bit parity bits for error correction.

Bit numbers associated with the navigation message are as follows.

The number of bits per word=30 bit/word;

The number of bits per subframe=10 words/subframe×30 bits/word=300 bit/subframe;

The number of bits per page=5 subframes/page×10 words/subframe×30 bit/word=1500 bits/page; and The number of bits in 25 pages=25 pages×5 subframes/page×10 words/subframe×30 bits/word=75,000 bits/25 pages.

In the above navigation data structure, the navigation data bit estimator 240 receives the basic information containing ephemeris data and almanac data from the PDE server 206 and estimates most of the data bits of 25 pages of 5 subframes by using the basic information and the system time of the mobile terminal 270, thereby producing entire SA data with no time restriction. For comparison, the mobile-assisted SA data contains no more than 10 seconds of data bits.

Now a detailed description will be made of subframes and words generated in the navigation data bit estimator 240.

FIGS. 4A through 4E and FIGS. 5A through 5E illustrate the subframes of navigation data. Shaded portions denote estimable data bits.

Subframes 1, 2 and 3 comprise ephemeris data which is maintained in the same format in every page until it is updated by the GPS satellite.

Figure 4A:
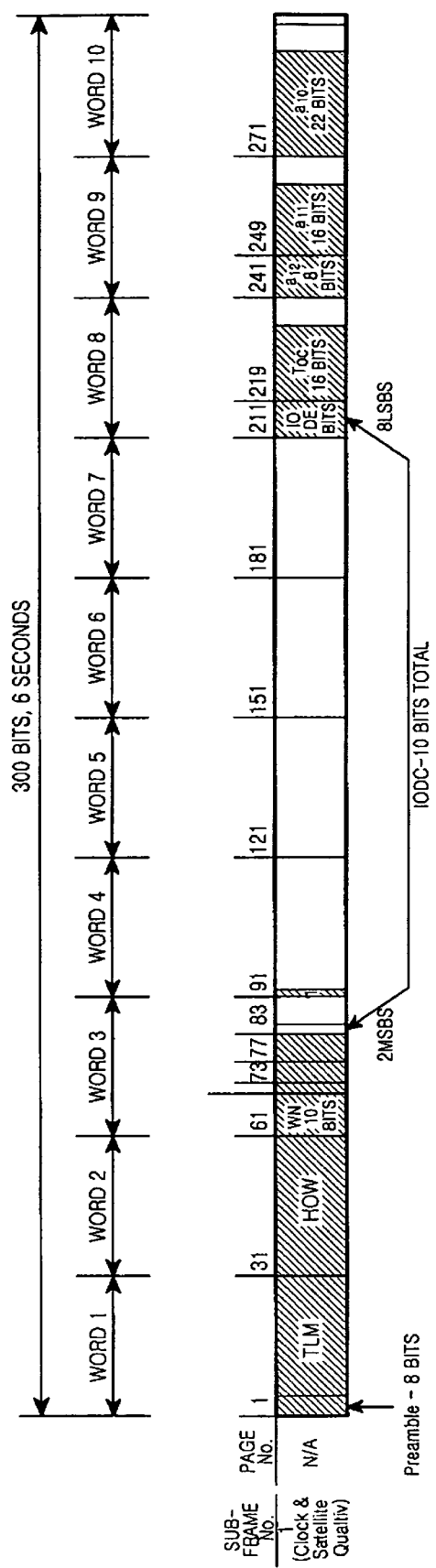
FIGS. 4A through 4E and FIGS. 5A through 5E illustrate the subframes of the navigation data.

FIG. 4A illustrates subframe 1 that provides clock and quality information.

Referring to FIG. 4A, word 1 comprises an 8-bit preamble for subframe synchronization, and a Telemetry (TLM) word. The TLM word has a 16-bit TLM with telemetry information and a 6-bit parity (P). The parity bits are comprised in every word. The preamble is a fixed value '0x8B', and the TLM is derived from the CDMA time information. Word 2 is a Handover Word (HOW) for containing a 17-bit truncated Time of Week (TOW) and information indicating the start position of the next subframe. The TOW is information expressed in seconds, indicating how much time has elapsed from Sunday. It is derived from the CDMA time information. Word 3 is of a period 1024. It includes a Week Number (WN) which is counted beginning in 1980, and bits of a fixed value. The WN is derived from the CDMA time information.

Issue Of Data, Clock (IODC), which occupies some last bits of word 3 and some first bits of word 10, indicates the issue number of a changed data set depending on whether any change has occurred to clock correction parameters. Two Most Significant Bits (MSBs) of the IODC are not known from the basic information. At least part of word 8 and word 10 are known from the basic information. 8 MSBs of word 8 are Issue of Data, Ephemeris (IODE) being the 8 Least Significant Bits (LSBs) of the IODC. 16 bits of word 8, $T_{OC}$ represents a reference time for satellite clock correction. 8 bits and 16 bits of word 9, $af_2$ and $af_1$ and 22 bits of word 10, $af_0$ denote polynomial correction coefficients corresponding to a frequency error change rate for phase clock correction, frequency error, and phase error, respectively.

Figure 4B:
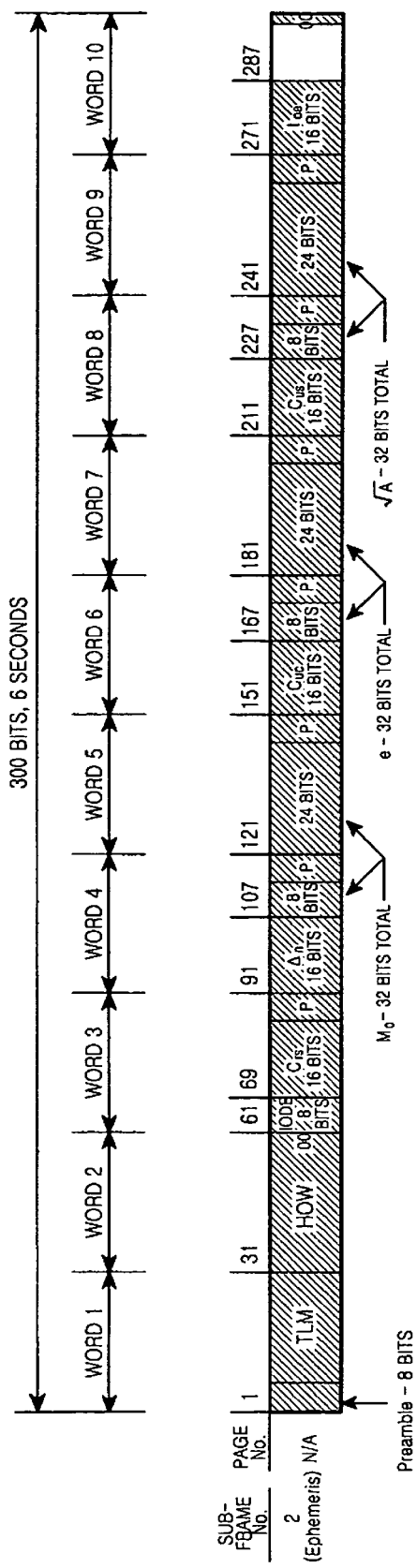

FIG. 4B illustrates subframe 2 that provides ephemeris data.

Referring to FIG. 4B, word 1 and word 2 are identical to word 1 and word 2 of subframe 1. Word 3 has an 8-bit IODE and a 16-bit $C_{rs}$ for representing the amplitude of the sine harmonic correction term to the orbit radius. In word 4, there are a 16-bit $\Delta_n$ representing a mean motion difference from a computed value and 8 MSBs of $M_0$ for representing mean anomaly at reference time. Word 5 has 24 LSBs of $M_0$.

Word 6 comprises a 16-bit $C_{uc}$ representing the amplitude of the cosine harmonic correction term to the argument of latitude, and 8 MSBs of e representing eccentricity of the orbit. Word 7 has 24 LSBs of e. Word 8 comprises $C_{us}$ for representing the amplitude of the sine harmonic correction term to the argument of latitude and 8 MSBs of $\sqrt{A}$ for representing the square root of the semi-major axis, and word 9 has 24 LSBs of $\sqrt{A}$. Word 10 comprises a 16-bit $t_{oe}$ for representing reference time for ephemeris, and unestimable bits.

Figure 4C:
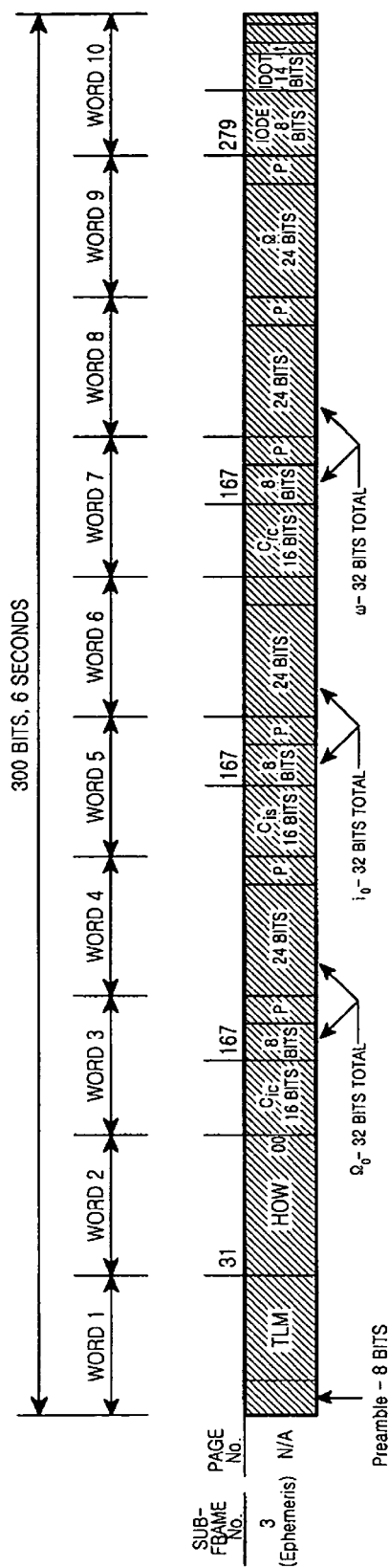

FIG. 4C illustrates subframe 3 having ephemeris data.

Referring to FIG. 4C, word 1 and word 2 of subframe 1 are also repeated in subframe 3. Word 3 has a 16-bit $C_{ic}$ for representing the amplitude of the cosine harmonic correction term to the angle of inclination, and 8 MSBs of $\Omega_0$ for representing the longitude of ascending node of orbit plane at reference time. Word 4 has 24 LSBs of $\Omega_0$. Word 5 provides a 16-bit $C_{is}$ for representing the amplitude of the sine harmonic correction term to the angle of inclination, and 8 MSBs of $i_0$ for representing an inclination angle at reference time. Word 6 has 24 LSBs of $i_0$.

Word 7 has a 16-bit $C_{rc}$ for representing the amplitude of the cosine harmonic correction term to the orbit radius, and 8 MSBs of ω for representing argument of perigee. Word 8 has 24 LSBs of ω. Word 9 provides a 24-bit $\dot{\Omega}$ for representing rate of right ascension. Word 10 has an 8-bit IODE and a 14-bit IDOT for representing rate of inclination angle.

Figure 4D:
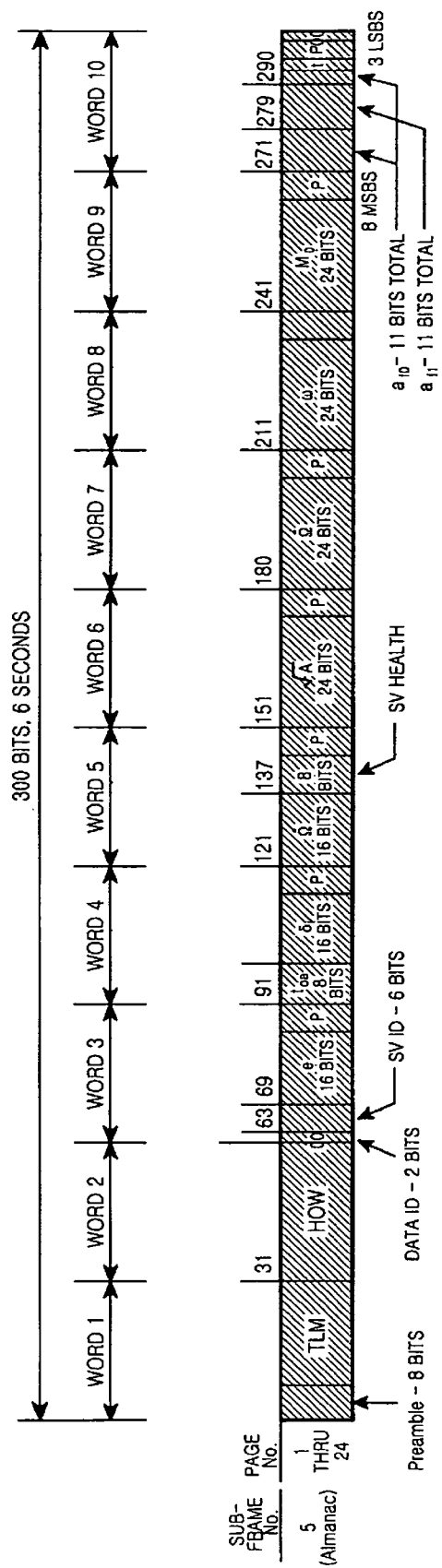

FIG. 4D illustrates pages 1 through 24 of subframe 5 having almanac data.

Referring to 4D, word 1 and word 2 are identical to word 1 and word 2 of subframe 1. Word 3 has a 6-bit Space Vehicle (SV) ID and a 16-bit e. Word 4 provides a 8-bit $t_{oa}$ for representing Time of Almanac (ToA) and a 16-bit $\delta$ relative to $i_0$=0.3 (semi-circles). In word 5, there are a 16-bit $\dot{\Omega}$ and an 8-bit SV Health. 3 MSBs of the SV Health indicate the health of the navigation data and 5 LSBs thereof indicate the health of the satellite's signal components. For example, the 5 LSBs indicate whether a Clean and Acquisition or Coarse and Acquisition (C/A) signal in the L1 band is weak or dead. In the presence of almanac data from the PDE server, the SV Health is filled with 1s and, otherwise, it is filled with 0s.

Word 6 has a 24-bit $\sqrt{A}$ and word 7 has a 24-bit $\Omega_0$. Word 8 comprises a 24-bit $\omega$ and word 9 comprises a 24-bit $M_0$. An 11-bit $a_{f0}$ and an 11-bit $a_{f1}$ exist in word 10. $a_{f1}$ is interposed between 8 MSBs and 3 LSBs of $a_{f0}$.

Figure 4E:
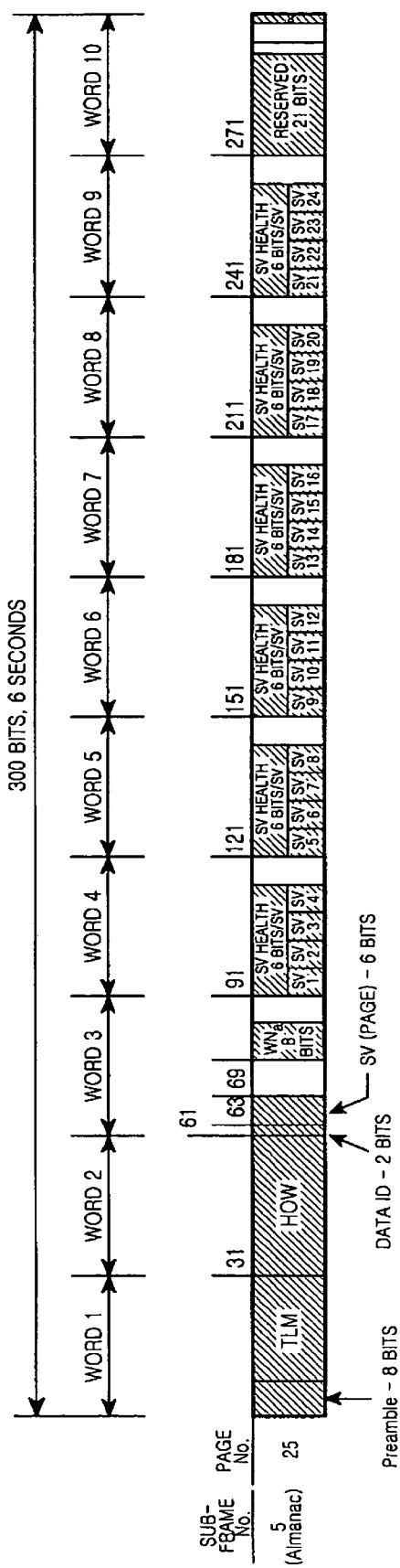

FIG. 4E illustrates page 25 of subframe 5 having almanac data.

Referring to FIG. 4E, word 1 and word 2 of subframe 1 are repeated in subframe 5. Word 3 comprises a 6-bit SV Page and an 8-bit $WN_a$ for representing the number of the week to which the almanac reference time $t_{oa}$ is referenced. Word 4 through word 9 each comprises a 6-bit SV Health for 4 SVs. Therefore, up to 24 SV Healths can be included in subframe 5 of page 25. 21 bits of word 10 are reserved. Each SV Health is included in the basic information received from the PDE server.

Regarding the SV Page, pages 1 to 24 of subframe 5 and pages 2 to 5 and 7 to 10 of subframe 4 have almanac data for their corresponding satellites among a total of 32 satellites. If SV ID is 0 (binary all 0s), it indicates a dummy SV. There exist SV IDs of 33 to 50. If the SV ID is one of 51 through 63, it indicates alternative contents instead of almanac data for a specific satellite.

Word 1 and word 2 of subframe 1 are repeated in all pages of subframe 4 illustrated in FIGS. 5A to 5E.

Figure 5A:
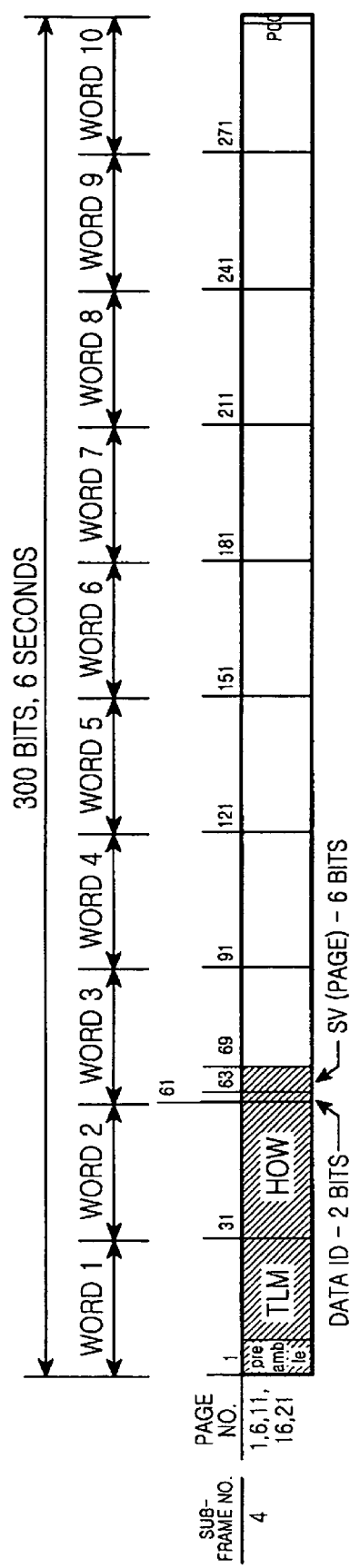
Figure 5B:
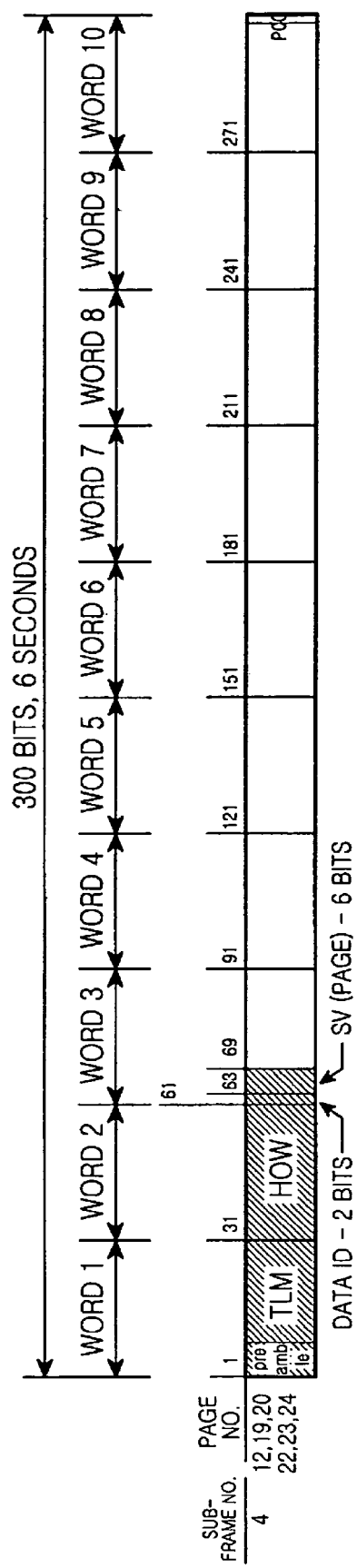

FIG. 5A illustrates subframe 4 with almanac data in pages 1, 6, 11, 16 and 21, and FIG. 5B illustrates subframe 4 with almanac data in pages 12, 19, 20, 22, 23, and 24. Referring to FIGS. 5A and 5B, the first 2 bits of word 3 indicates a Data ID and the following 6 bits indicates a SV Page. Since the remaining bits of word 3 and word 4 to word 10 are in an unestimable information format in pages 1, 6, 11, 12, 16, and 19 to 24 of subframe 4, the navigation data bit estimator fills them with 0s.

Figure 5C:
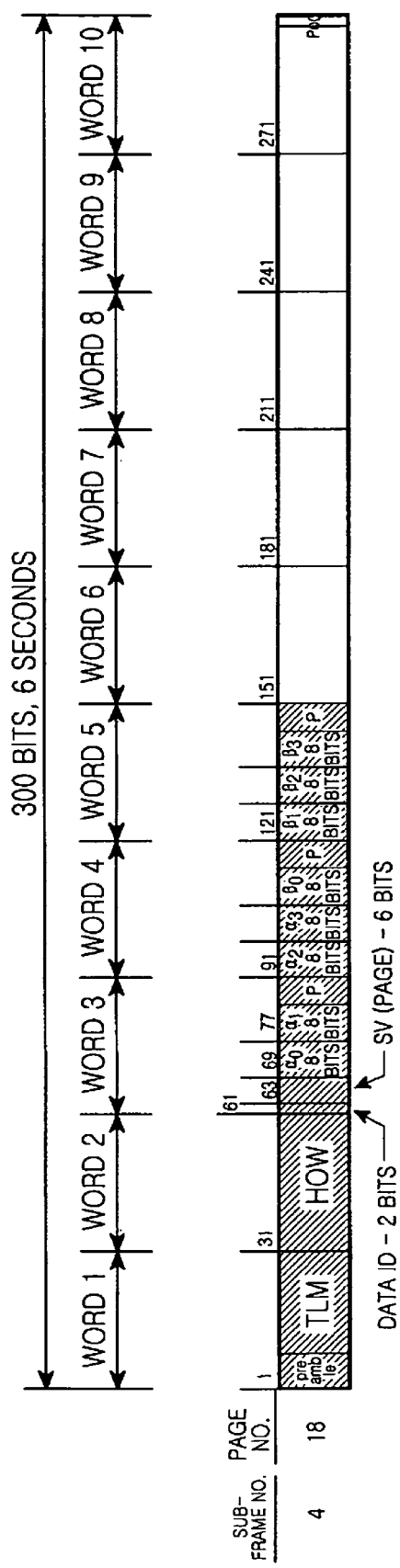

FIG. 5C illustrates page 18 of subframe 4 with the ionospheric information of almanac data. Word 3 comprises a 2-bit Data ID, a 6-bit SV Page, an 8-bit $\alpha_0$, and an 8-bit $\alpha_1$. Word 4 has $\alpha_2$, $\alpha_3$, and $\beta_0$, each being 8 bits. Word 5 comprises $\beta_1$, $\beta_2$, and $\beta_3$, each being 8 bits. $\alpha_i$ (i=0, 1, 2, 3) represents the coefficients of a cubic equation representing the amplitude of the vertical delay for correction of errors caused by ionospheric effect. $\beta_i$ (i=0, 1, 2, 3) the coefficients of a cubic equation representing the period of the model for correction of errors caused by ionospheric effect. The coefficients are comprised in the basic information.

Figure 5D:
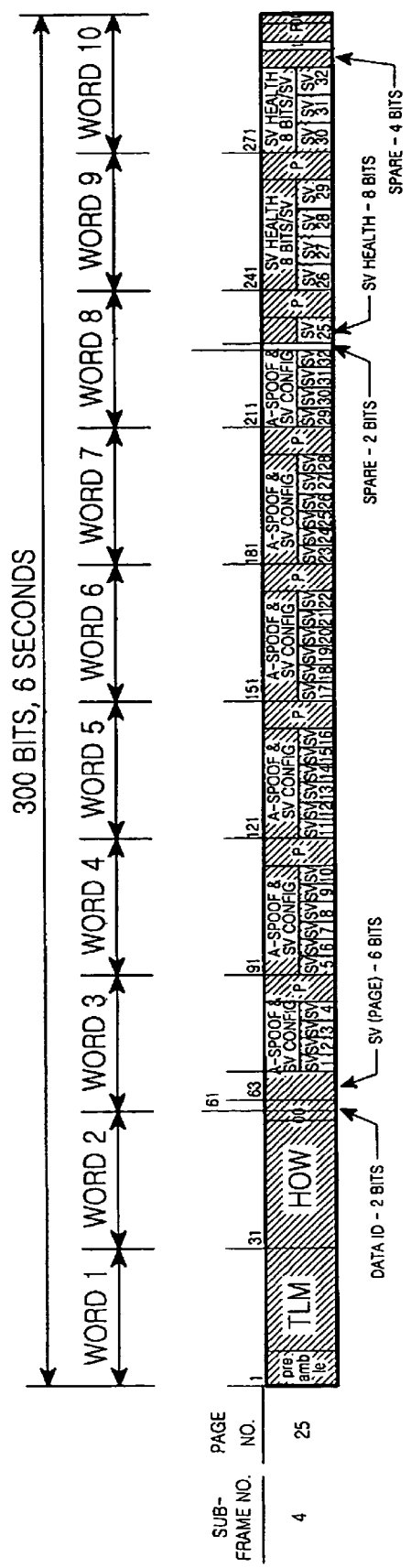

FIG. 5D illustrates page 25 of subframe 4 with the anti-spoof information of almanac data. Word 3 comprises a 2-bit Data ID and a 6-bit SV Page. The remaining part of word 3 and word 4 to word 8 comprises SV Config encrypted with the P (Precision or Protect) code which is not opened to civilian users and allows access only for military uses. A last part of word 8, word 9 and word 10 comprises SV Health information that has not yet included in page 25 of subframe 5. In the presence of the basic information from the PDE server, the SV Config information is established to "1001" and otherwise, it is set to "0000", The SV Health information can be obtained form the basic information.

Figure 5E:
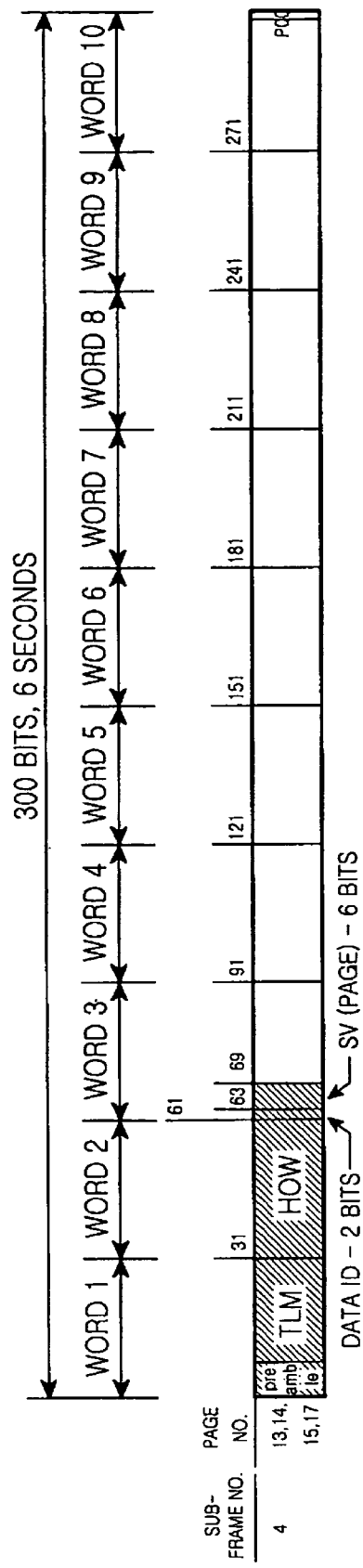

FIG. 5E illustrates subframe 4 with almanac data in pages 13, 14, 15, and 17. Like subframe 4 illustrated in FIGS. 5A and 5B, word 3 to word 10 except a first part of word 3 are in an unestimable format. Thus, the navigation data bit estimator fills 0s in them.

Among all data bits of subframes 1, 2 and 3 illustrated in FIGS. 4A, 4B and 4C, data bits can be estimated at the following ratios by using the ephemeris data of the basic information in the IS-801 format received from the PDE server 206:

the ratio in number of estimable bits to total bits in subframe 1=159 bits/300 bits (53%);

the ratio in number of estimable bits to total bits in subframe 2=288 bits/300 bits (96%); and the ratio in number of estimable bits to total bits in subframe 3=300 bits/300 bits (100%).

Therefore, the ratio of total estimable bits to the ephemeris data=747 bits/900 bits (83%)

As noted from FIGS. 4D and 4E and FIGS. 5A through 5E, subframes 4 and 5 having almanac data have different formats in different pages. Regarding data formats opened in public, subframe 4 illustrates in FIGS. 5A through 5E have three different formats. Subframe 4 has of the same format in pages 1, 6, 11 to 17, and 19 to 24, as illustrated in FIGS. 5A and 5B. Another format is available to subframe 4 in page 18, as illustrated in FIG. 5C. A third data format illustrated in FIG. 5D is used for page 25 of subframe 4.

In different data formats for subframe 4, data bits can be estimated at the following ratios:

the ratio in number of estimable bits to total bits in subframe 4 of pages 1, 6, 11 through 17, and 19 through 24=70 bits/300 bits (23.2%);

the ratio in number of estimable bits to total bits in subframe 4 of page 18=152 bits/300 bits (50.7%); and the ratio in number of estimable bits to total bits in subframe 4 of page 25=300 bits/300 bits (100%).

Therefore, the average ratio in number of estimable bits to total bits in subframe 4=82.48 bits/300 bits (27.5%).

Subframe 5 has one format in pages 1 to 24, as illustrated in FIG. 4D and another format in page 25 as illustrated in FIG. 4E. For the two different data formats, subframe 5 can be estimated at the following ratios:

the ratio in number of estimable bits to total bits in subframe 5 of pages 1 to 24=300 bits/300 bits (100%); and the ratio in number of estimable bits to total bits in subframe 5 of page 25=257 bits/300 bits (85.7%).

Thus, the average ratio in number of estimable bits to total bits in subframe 5=7457 bits/7500 bits (99.4%).

The ratio in number of estimable bits to total bits in all subframes=30964 bits/(300 bits/subframe×5 subframes/page×25 pages)=30694 bits/37500 bits (81.9%).

Consequently, the navigation data bit estimator 240 estimates 81.9% of the total available data bits of the navigation data as SA data.

Figure 2B:
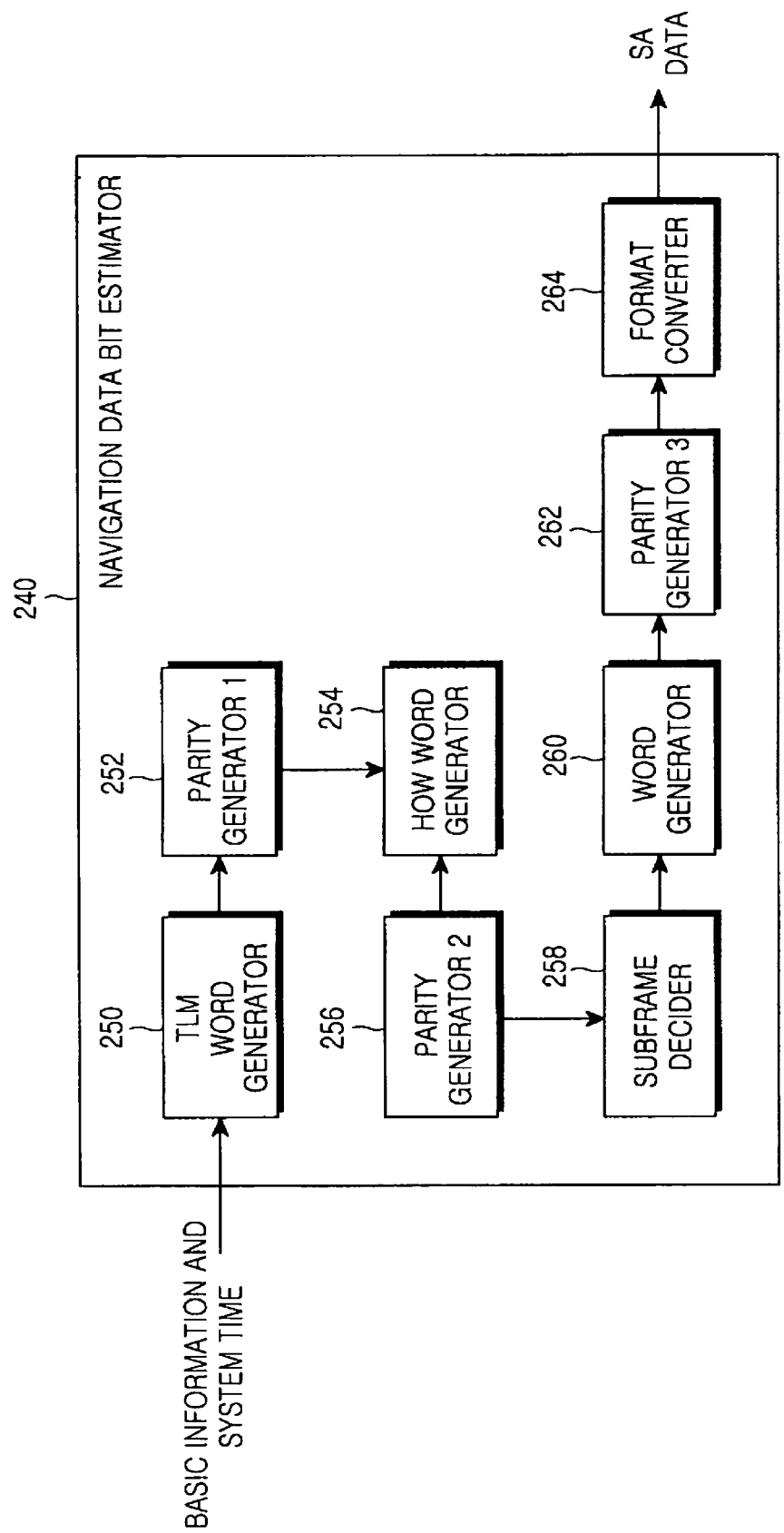
FIG. 2B is a detailed block diagram illustrating a navigation data bit estimator illustrated in FIG. 2A.

With reference to FIG. 2B, the configuration and operation of the navigation data bit estimator 240 will be described in detail.

Referring to FIG. 2B, in the navigation data bit estimator 240, a Telemetry (TLM) word generator 250 and a Handover Word (HOW) word generator 254 generate a TLM word and a HOW word for word 1 and word 2 common to all subframes by using the basic information of the GPS satellite and the CDMA system time received over the CDMA mobile communication network. First and second parity generators 252 and 256 generate parity bits for error correction of the TLM word and the HOW word by encoding the TLM word and the HOW word, respectively and add the parity bits to the TLM word and the HOW word, thereby constructing word 1 and word 2.

A subframe decider 258 determines a page number and a subframe number according to the CDMA system time. A word generator 260 generates the remaining words, word 3 through word 10 of the subframes by using the ephemeris data and almanac data of the basic information. A third parity generator 262 generates parity bits for error correction of word 3 through word 10 and adds the parity bits to word 3 through word 10.

A format converter 264 constructs SA data in the IS-801 format by combining parity-added word 1 through word 10. The SA data is provided to the correlator & coherent integrator 234. The correlator & coherent integrator 234 eliminates compensation for a coherent integration result caused by unexpectable inversion of navigation data bits in the course of a long-time coherent integration of up to 100 ms.

The navigation data from the GPS satellite is modulated in Phase Shift Keying (PSK) that inverts the phase of a carrier according to data 1 or 0. Therefore, the phase of a replica signal to be correlated with a received true GPS signal must be substantially identical to that of the true GPS signal. Since the SA data of an exemplary embodiment of the present invention replicates all estimable bits among the total data bits of the navigation data, it enables a long-time coherent integration in the correlator & coherent integrator 234.

FIGS. 6A through 6D are flowcharts illustrating an operation for configuring subframes of network data according to an exemplary embodiment of the present invention. The following description will be made with the appreciation that this operation is performed in the mobile terminal, although in the navigation data bit estimator, to be exact.

Figure 6A:
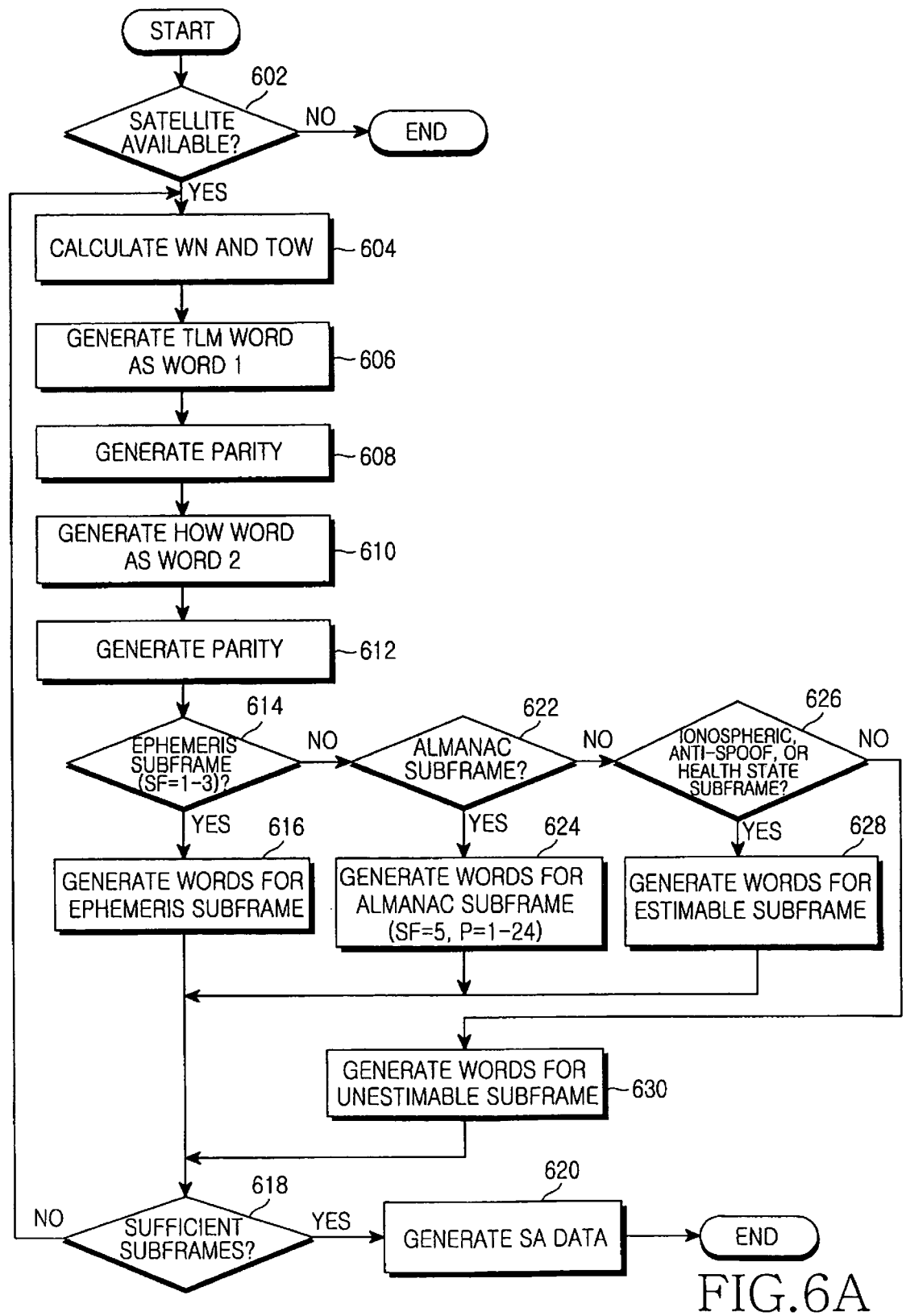
FIGS. 6A through 6D are flowcharts illustrating an operation for configuring the subframes of network data according to an exemplary embodiment of the present invention.

Referring to FIG. 6A, the mobile terminal determines the presence or absence of available satellites by determining whether basic information has been received from the PDE server through the CDMA base station in step 602. If any satellite is available, the mobile terminal calculates a Week Number (WN) and a Time of Week (TOW) by using CDMA system time in step 604. A subframe number and a page number are determined based on the WN and TOW.

In step 606, word 1 of every subframe, that is, a TLM word is generated by using the WN. A preamble is attached to the TLM word, for detection of the start of the subframe. The preamble is a fixed constant of 0x8B, a hexadecimal number. 6 parity bits are generated for the TLM word, through parity coding in step 608.

In step 610, word 2 of every subframe, that is, a HOW word is generated by using the WN. After all bits are filled in the HOW word, 6 parity bits are generated for the HOW word, through parity coding in step 612. Although the TLM word and the HOW word are common to every subframe, information bits in word 3 through word 10 differ in different subframes and pages. Thus, the subframes and pages are identified in the following manner.

In step 614, the mobile terminal determines whether to construct an ephemeris subframe based on the subframe number and page number determined by the WN and TOW. If the subframe number is one of 1, 2 and 3, the mobile terminal generates word 3 through word 10 for an ephemeris subframe irrespective of the page number. If the subframe number is any other number, the mobile terminal determines whether to generate an almanac subframe for subframe 5 of page 1 through page 24. If it does, the mobile terminal generates word 3 through word 10 for the almanac subframe in step 624. In step 626, the mobile terminal determines whether to generate another estimable subframe, for example, an ionospheric subframe for subframe 4 of page 18, an anti-spoof subframe for subframe 4 of page 25, or a health subframe for subframe 5 of page 25. The mobile terminal generates word 3 through word 10 for a corresponding subframe in step 628. If the subframe to be generated is not any of the above ionospheric, anti-spoof and health subframes, the mobile terminal generates the words for the other unestimable subframe according to the subframe number and the page number in step 630. To be more specific, the mobile terminal generates word 3 through word 10 for subframe 4 of pages 1, 6, and 11 through 24.

Upon generation of words in step 616, 624, 628 or 630, the mobile terminal determines whether 25 subframes with which to construct an entire navigation message have been generated in step 618. If subframes remain to be generated, the mobile terminal returns to step 604. Then, the TOW is calculated again. While the WN comprised in the TLM word is common to every subframe in the navigation data, the TOW represents how much time has elapsed from Sunday in seconds and one subframe is 6 seconds in duration. Therefore, the TOW is updated by adding 6 seconds to the previous TOW in order to construct the next subframe.

On the other hand, if the total subframes have been generated, the mobile terminal generates SA data representing the navigation data of a corresponding satellite by combining the subframes in step 620. The SA data is provided to the correlator & coherent integrator 234 of the GPS baseband processor 224.

Figure 6B:
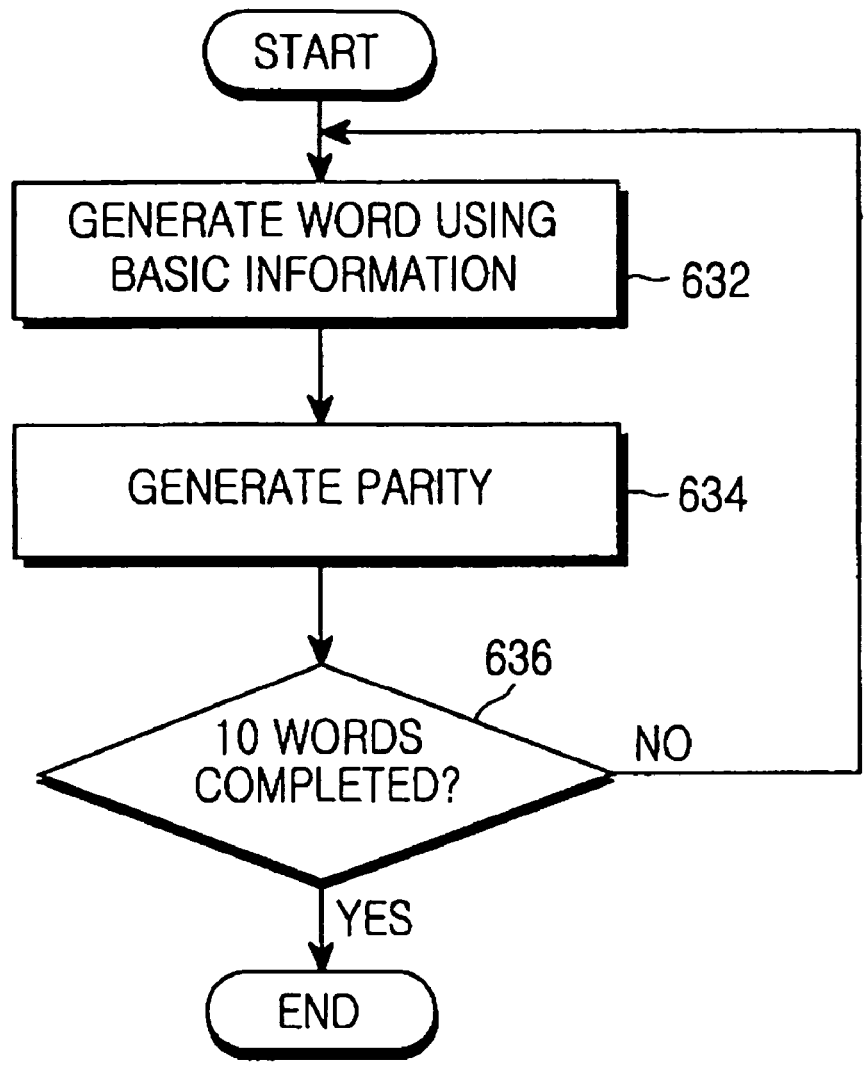

FIG. 6B is a detailed flowchart illustrating the operations for generating words based on the basic information received from the PDE server in steps 616 and 628 illustrated in FIG. 6A.

Referring to FIG. 6B, the mobile terminal generates one of word 3 through word 10 in a corresponding subframe according to corresponding information bits of ephemeris data or almanac data comprised in the basic information in step 632. The mobile terminal generates parity bits for the generated word by parity coding in step 634 and determines whether 10 words have all been generated for the subframe in step 636. Upon completion of word generation for the subframe, the mobile terminal ends the procedure (steps 616 and 628). If words to be generated still remain, the mobile terminal returns to step 632.

Figure 6C:
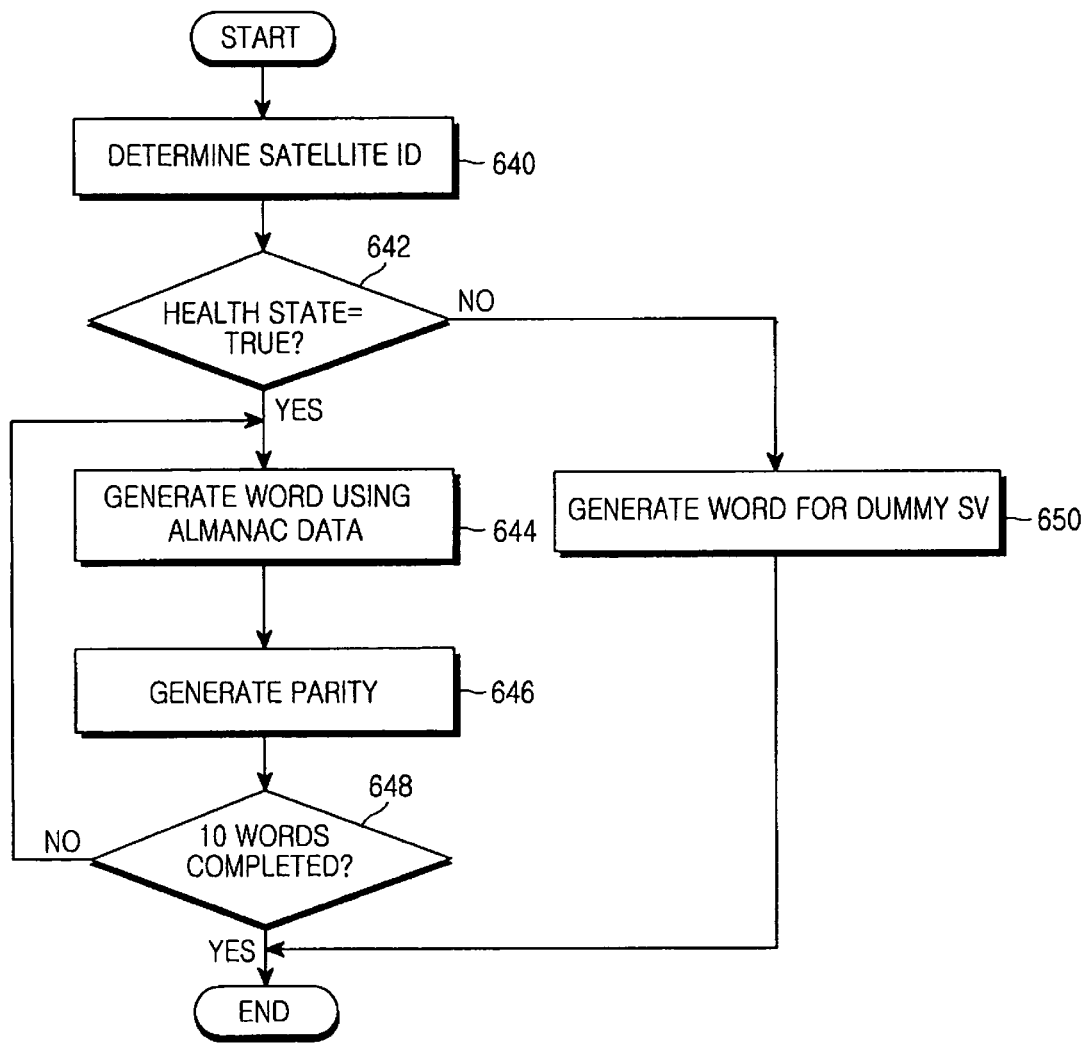

FIG. 6C is a detailed flowchart illustrating the operation for generating words for an almanac subframe as subframe 5 of pages 1 through 24 in step 624 illustrated in FIG. 6A.

Referring to FIG. 6C, the mobile terminal sets a SV ID based on the relationship between a subframe number and a page number.

For example,

1. SV IDs 1 through 24 are assigned to pages 1 through 24 of subframe 5;

2. SV IDs 25 through 28 are assigned to pages 2 through 5 of subframe 4, and SV IDs 29 through 32 are assigned to pages 7 through 10 of subframe 4; and 3. The same SV ID of 57 is assigned to in pages 1, 6 and 11 of subframe 4. Additionally, the SV ID is decided considering the SV IDs of subframe 5.

In step 642, it is determined based on the basic information whether the health state associated with the satellite ID is true. If it is not true, a word suitable for a dummy SV is established as SV Health in step 650 and the procedure ends. The dummy SV indicates a satellite whose almanac data is not provided by the PDE server. In this case, the almanac message for the dummy SV contains alternating 1s and 0s, "101010 . . . ", with valid parity bits, a Data ID of "01", and a SV ID of "000000".

If the health state is true, the mobile terminal generates words with almanac data for the satellite ID of the basic information in step 644 and generates parity bits for the words through parity coding in step 646. In step 648, the mobile terminal determines whether 10 words have all been generated for the almanac subframe. Upon completion of the 10 words, the mobile terminal ends step 622, and otherwise, it returns to step 644.

Figure 6D:
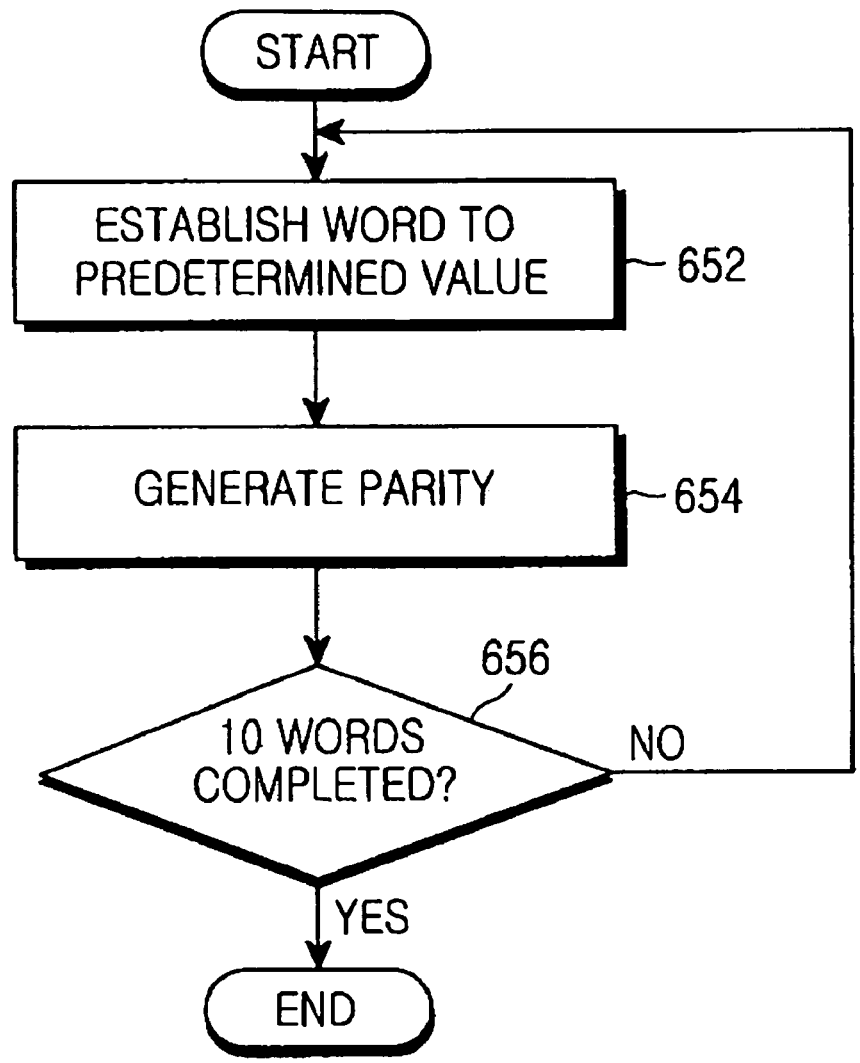

FIG. 6D is a detailed flowchart illustrating the subframe generation step 630 illustrated in FIG. 6A. That is, words for each satellite ID are filled with a predetermined or random value in step 630.

Referring to FIG. 6D, the mobile terminal establishes one of the words of an unestimable subframe, that is, one of word 3 through word 10 in pages 1, 6, and 11 through 24 of subframe 4 to a predetermined or random value in step 652 and generates parity bits for the generated word through parity coding in step 654. In step 656, the mobile terminal determines whether 10 words have all been generated for the subframe. Upon completion of the 10 words, the mobile terminal ends step 620, and otherwise, it returns to step 652.

The above-described apparatus and method increase GPS reception sensitivity in a mobile terminal that operates in a mobile-based manner. In a test, SNR (S/N) was measured every one millisecond for each subframe at the GPS receiver by using SA data according to an exemplary embodiment of the present invention. The results of the test show SNR measurements with respect to SA application and non-SA application in subframes and pages. In FIGS. 7 through 13, "Applied SA" indicates that a GPS signal is received, applying SA data. "HIGH" indicates SA application and "LOW" indicates non-SA application, which is establishing data bits of a corresponding time period to a random value. "Measured S/N" indicates S/N measurement for one subframe period.

Figure 7:
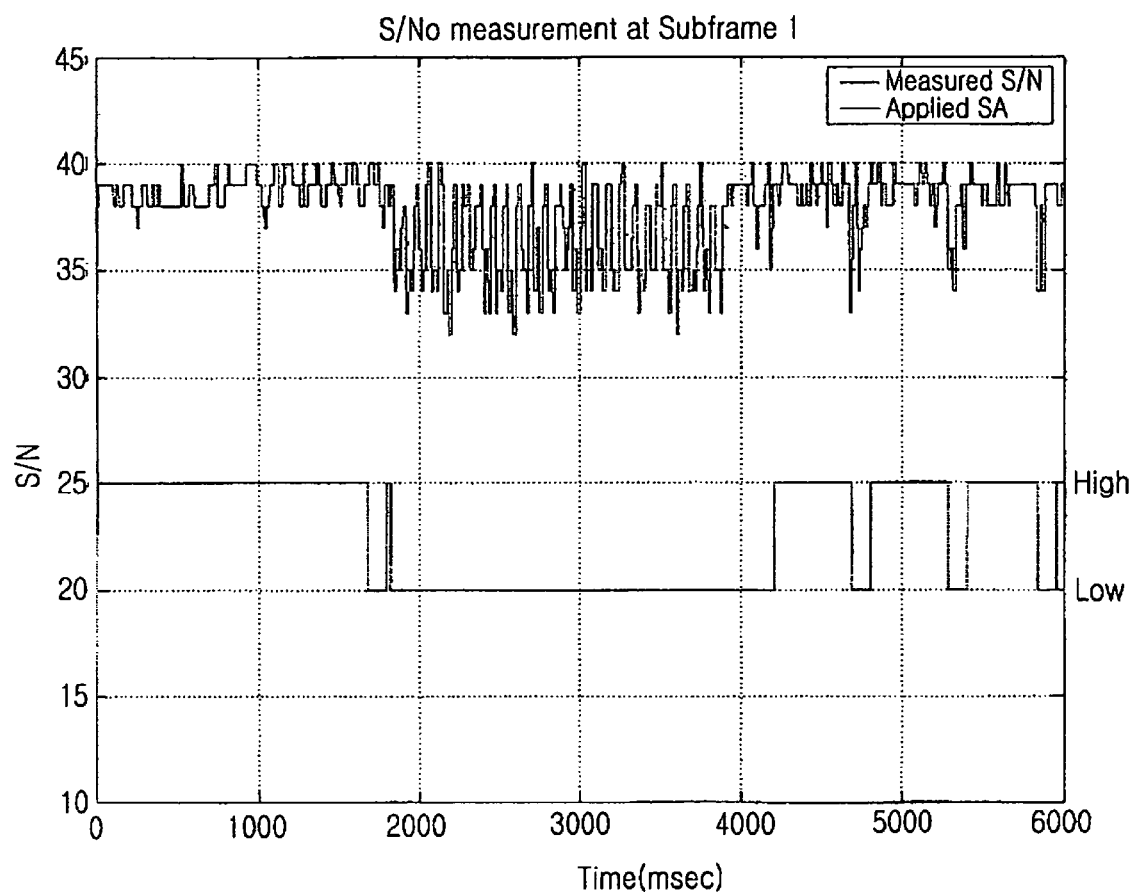
FIGS. 7 through 13 are graphs illustrating the signal-to-noise ratios (SNRs) of Sensitivity Assistance (SA)-applied subframe periods according to an exemplary embodiment of the present invention.

FIG. 7 is a graph illustrating S/N measurements in the reception time period of subframe 1. Subframe 1 comprises part of ephemeris data, in the same format in page 1 through page 25. As illustrated, about 120 bits of word 4 through word 7 of subframe 1 cannot be estimated. S/N is higher in the estimable period than in the unestimable period.

Figure 8:
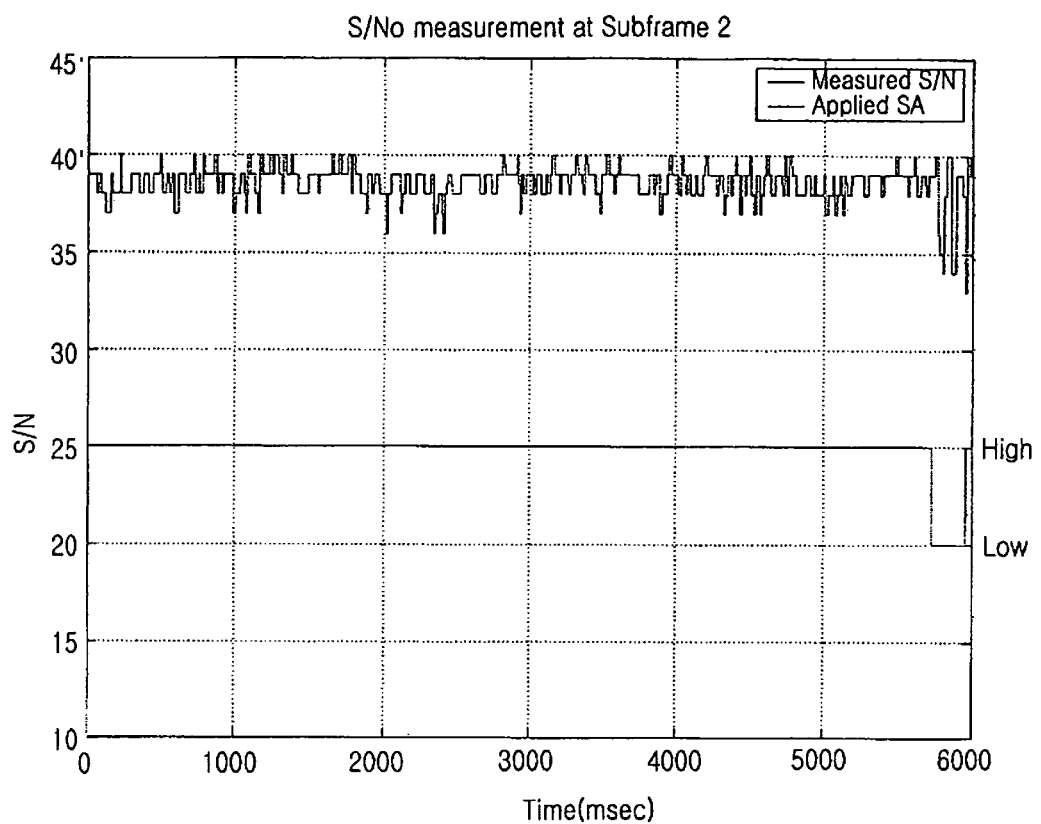

FIG. 8 is a graph illustrating S/N measurements in the reception time period of subframe 2. Subframe 2 comprises part of the ephemeris data, in the same format in page 1 through page 25. As illustrated, all data bits of subframe 2 except for part of word 10 can be estimated. Therefore, S/N is high in almost all period of subframe 2 except the unestimable period.

Figure 9:
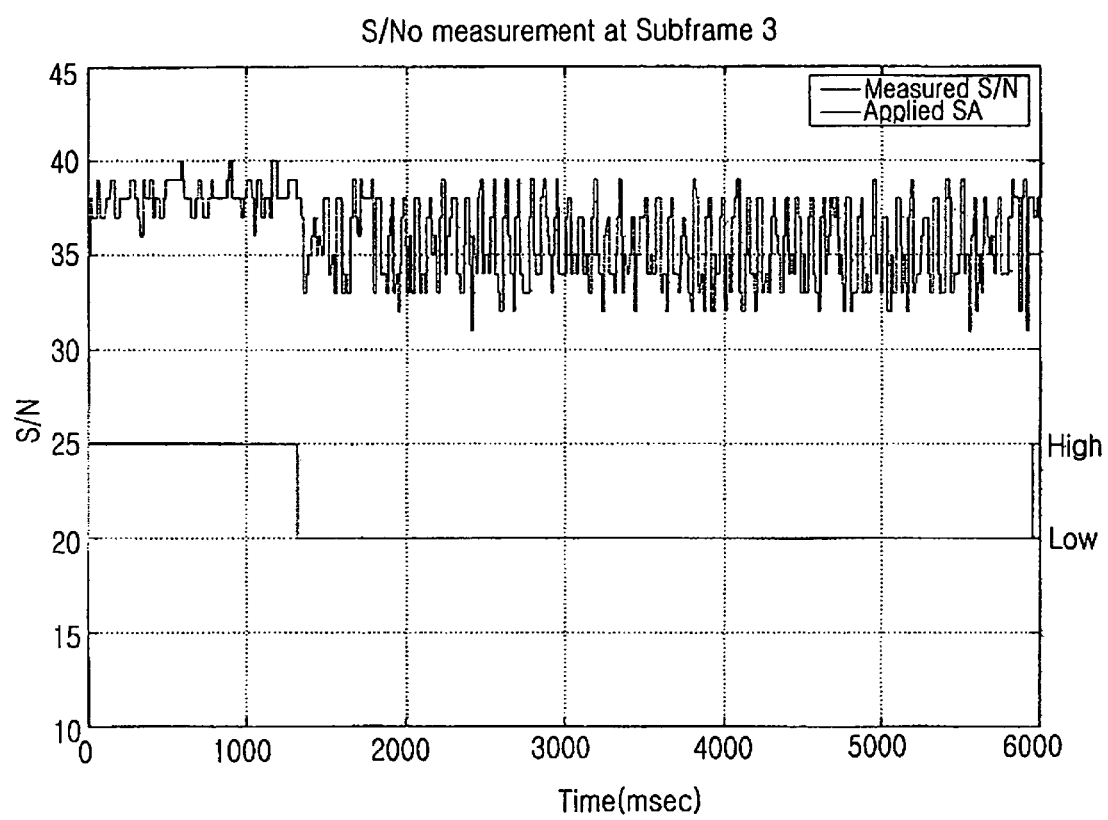

FIG. 9 is a graph illustrating S/N measurements in the reception time period of subframe 3. Subframe 2 comprises part of the ephemeris data, in the same format in page 1 through page 25. Since all data bits of subframe 3 can be estimated, S/N is high all over the entire subframe period.

Figure 10:
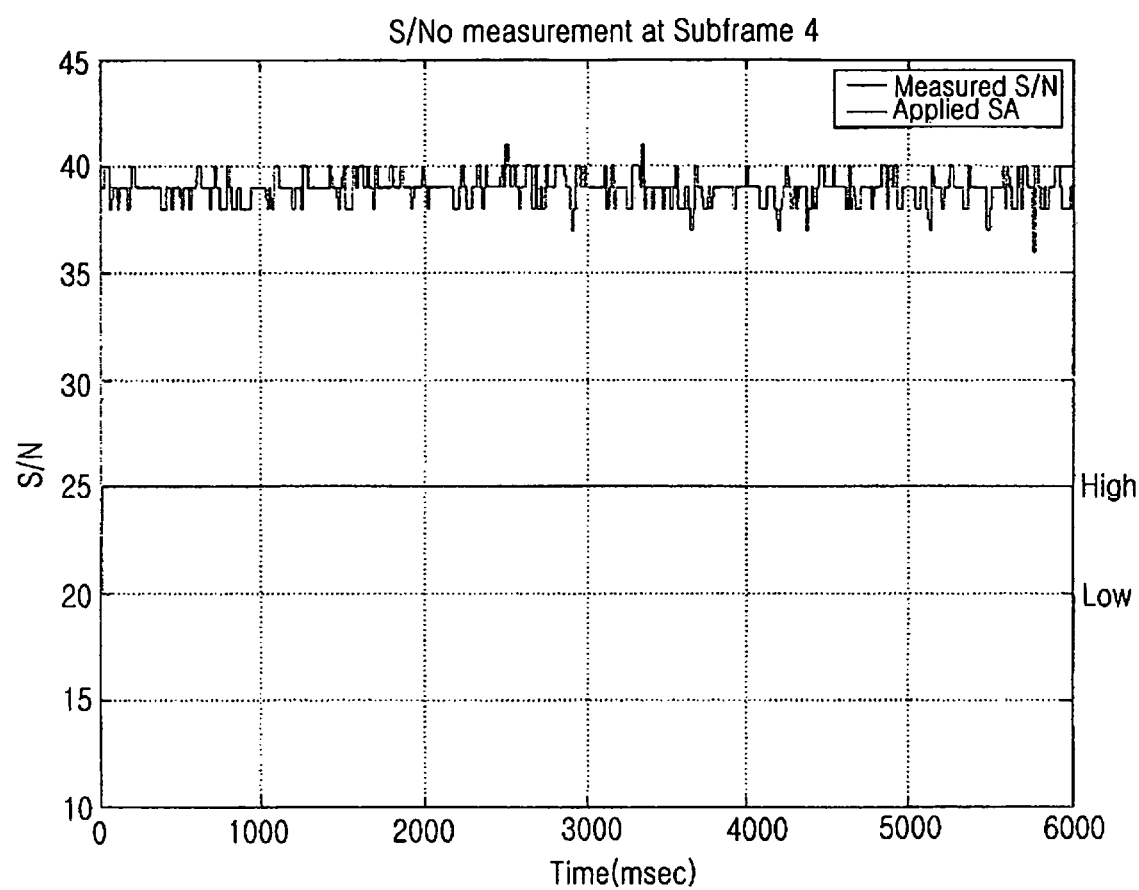

FIG. 10 is a graph illustrating S/N measurements in the reception time period of subframe 4 of pages 1, 6, 11, 15, 21 or pages 12, 19, 20, 22, 23, 24, or pages 13, 14, 15, 17. These pages exhibit an identical distribution of data bits recoverable in a mobile-based SA algorithm. Referring to FIG. 10, only part of words 1, 2, and 3 can be estimated in subframe 4 of pages 1, 6, 11, 15, 21 or pages 12, 19, 20, 22, 23, 24, or pages 13, 14, 15, 17. Therefore, S/N is high in the period of words 1, 2 and 3.

Figure 11:
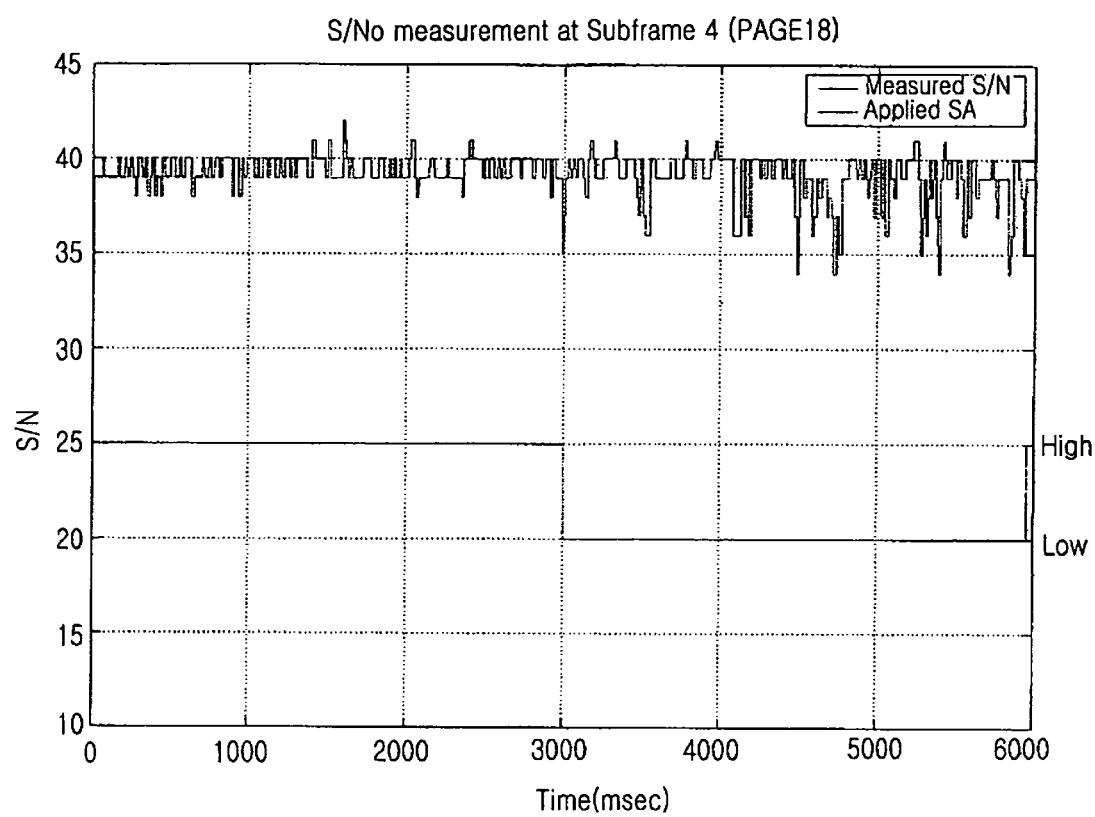

FIG. 11 is a graph illustrating S/N measurements in the reception time period of subframe 4 of page 18. Word 1 through word 5 and the last 2 bits of subframe 4 can be estimated. Hence, an about 50% estimable period of subframe 4 results high S/N.

Figure 12:
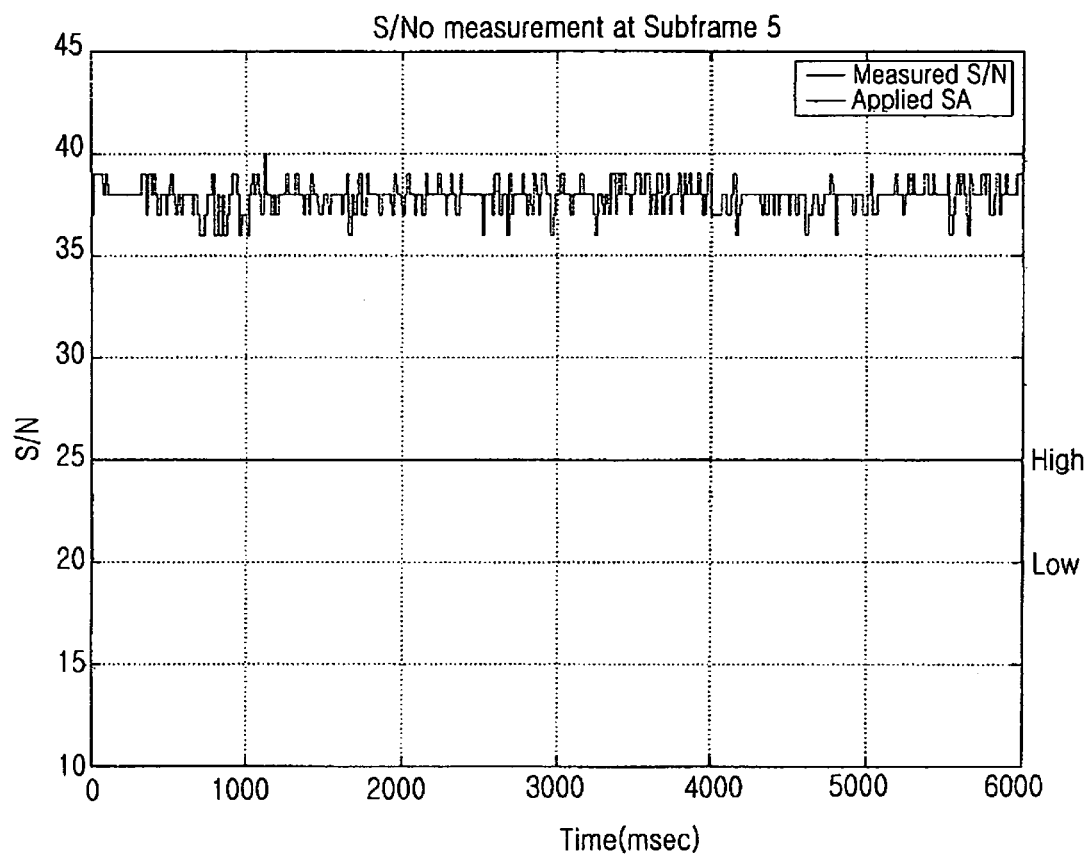

FIG. 12 is a graph illustrating S/N measurements in the reception time period of subframe 5 of page 1 through page 24. Subframe 5 provides almanac data in the same format in page 1 through page 24. All data bits of subframe 5 can be estimated in page 1 through page 24. Therefore, high S/N is observed over the whole subframe period.

Figure 13:
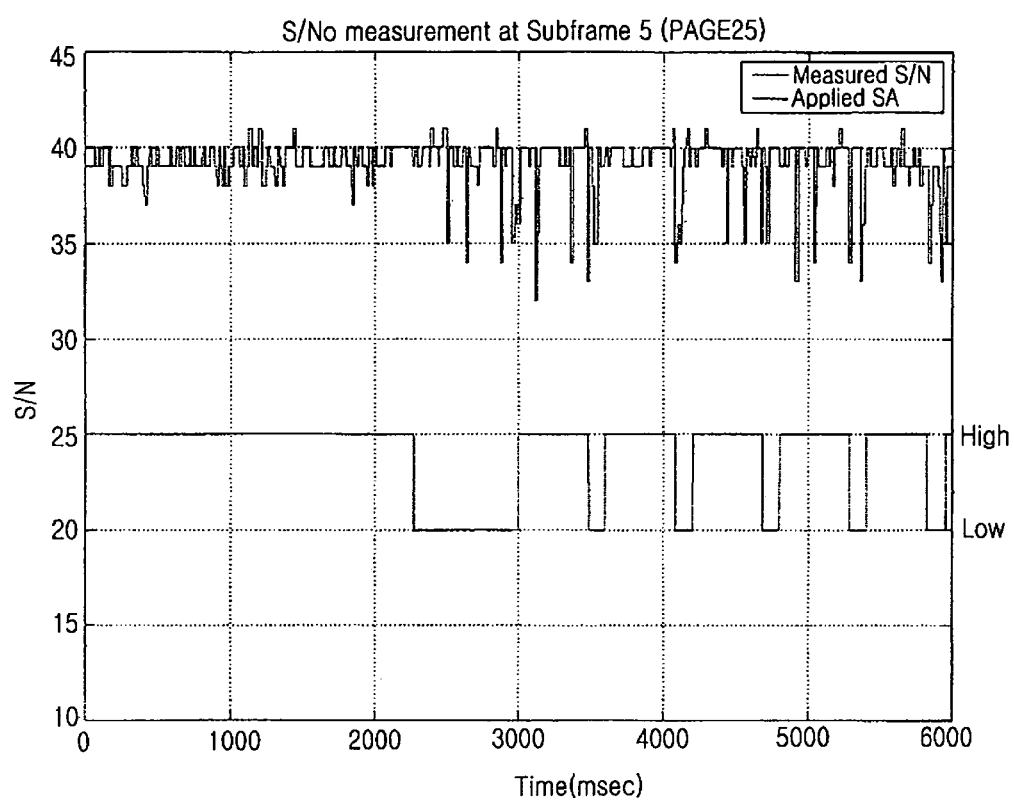

FIG. 13 is a graph illustrating S/N measurements in the reception time period of subframe 5 of page 25. Subframe 5 of page 25 provides part of SV health state data and part of this data is impossible to estimate. Thus, high S/N is observed except in the unestimable period.

As noted from FIGS. 7 through 13, high S/N is observed stably in the SA-applied periods, and S/N is decreased in the unestimable periods by up to 5 dB.

Figure 14:
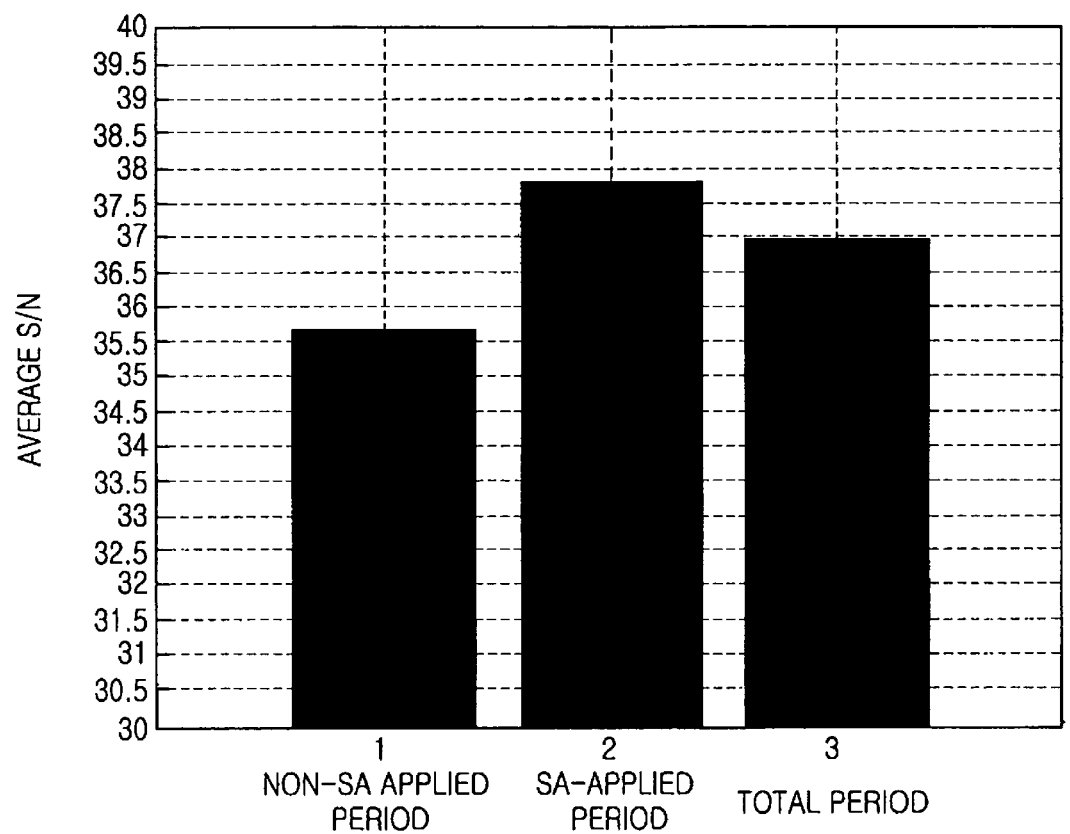
FIGS. 14 and 15 are graphs illustrating the average SNRs of a SA-applied period, a non-SA applied period, and a total period.

FIG. 14 is a graph illustrating the average S/N values of a SA-applied period, a non-SA applied period, and the total period in subframes 1, 2, and 3 having ephemeris data.

Referring to FIG. 14, the average S/N is 35.7 dB or less in the non-SA applied period, while it is 37.5 dB or greater in the SA-applied period. Hence, when receiving subframes 1, 2 and 3 of actual navigation data using subframes 1, 2 and 3 of SA data according to an exemplary embodiment of the present invention, an about 2.1-dB increase in reception sensitivity is achieved, compared to non-SA application. Table 1 below illustrates the average S/N measurements of subframes 1, 2 and 3.

TABLE 1

|  | Non-SA applied period | SA-applied period | Total period |
| --- | --- | --- | --- |
| Average S/N | 35.7 | 37.8 | 36.9 |

Figure 15:
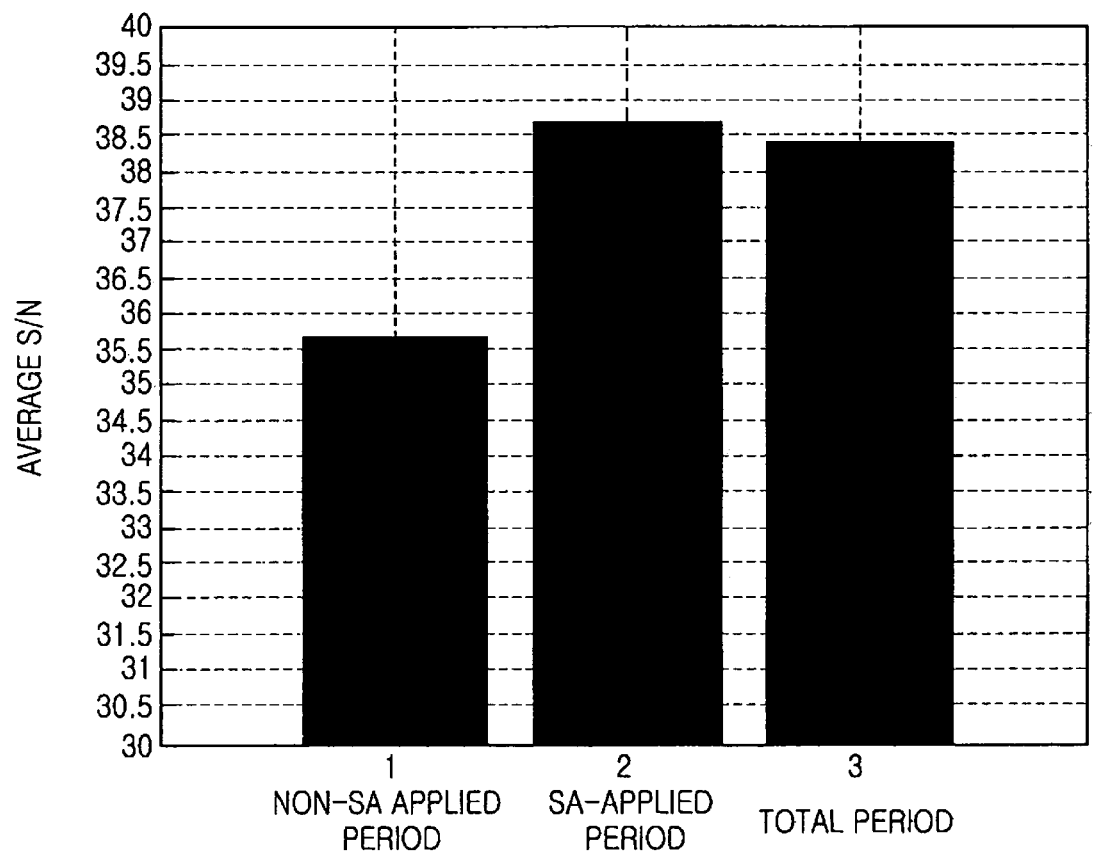

FIG. 15 is a graph illustrating the average S/N values of a SA-applied period, a non-SA applied period, and the total period in subframes 4 and 5 having almanac data.

Referring to FIG. 15, the average S/N is 35.6 dB or less in the non-SA applied period, while it is 38.7 dB or greater in the SA-applied period. Hence, when receiving subframes 4 and 5 of the actual navigation data by using subframes 4 and 5 of the SA data according to an exemplary embodiment of the present invention, an about 3.1 dB increase in reception sensitivity is achieved, compared to non-SA application. Table 2 below illustrates the average S/N measurements of subframes 4 and 5.

TABLE 2

|  | Non-SA applied period | SA-applied period | Total period |
| --- | --- | --- | --- |
| Average S/N | 35.6294 | 38.7 | 38.4 |

In accordance with the exemplary embodiments of the present invention as described above, a GPS receiver in a mobile terminal generates SA data similar to entire navigation data by using basic information about GPS satellites and CDMA time information received over a mobile communication network, and receives the actual navigation data using the SA data. Therefore, compensation for the result of coherent integration caused by data bit inversion during a long-time coherent integration can be prevented, and GPS reception sensitivity is advantageously increased in the mobile terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for receiving global positioning system (GPS) signals in a mobile terminal, comprising:
a first radio frequency (RF) receiver for receiving a first RF signal comprising basic information about a GPS satellite over a mobile communication network;

a first baseband processor for acquiring the basic information and system time of the mobile communication network based on the output of the first RF receiver;

a second RF receiver for receiving a second RF signal comprising navigation data from the GPS satellite;

a navigation data bit estimator for generating sensitivity assistance (SA) data by using the basic information and the system time, the SA data being a replica of the total information bits of the navigation data;

a second baseband processor for generating integrated samples by correlating a pseudo-random noise (PRN) code with the second RF signal and coherent-integrating the correlation result by using the SA data; and a signal detector for calculating a position solution of the mobile terminal by using the integrated samples received from the second baseband processor.

2. The apparatus of claim 1, wherein the second baseband processor comprises:

a message receiver for receiving the basic information from the first baseband processor; and a decoder for separating the basic information received from the message receiver into ephemeris data and almanac data and providing the ephemeris data and the almanac data to the navigation data bit estimator.

3. The apparatus of claim 1, wherein the navigation data bit estimator comprises:

a telemetry (TLM) word generator for generating a TLM word comprising telemetry information by using the system time;

a first parity generator for generating first parity bits by parity-encoding the TLM word and attaching the first parity bits to the TLM word, thereby creating a first word;

a handover word (HOW) word generator for generating a HOW word comprising time of week (TOW) information by using the system time;

a second parity generator for generating second parity bits by parity-encoding the HOW word and attaching the second parity bits to the HOW word, thereby creating a second word;

a subframe decider for calculating a subframe number and a page number for the SA data by using the system time, and determining a subframe according to the subframe number and the page number;

a word generator for generating third through tenth words for the determined subframe by using the basic information;

a third parity generator for generating third through tenth parity bits by parity-encoding the third through tenth words and attaching the third through tenth parity bits to the third through tenth words; and a format converter for constructing one frame with the first through tenth words comprising the parity bits in a predetermined format.

4. The apparatus of claim 3, wherein the word generator generates the third through tenth words by establishing estimable bits of the third through tenth words using the basic information, if the subframe is decided to be a ephemeris subframe for subframe 1 through subframe 3 according to the subframe number and the page number.

5. The apparatus of claim 3, wherein if the subframe is decided to be an almanac subframe for subframe 5 of page 1 through page 24 according to the subframe number and the page number, the word generator determines satellite identifiers (IDs) according to the relationship between the subframe number and the page number, sets a satellite ID for the third through tenth words of the subframe to indicate a dummy space vehicle (SV) if the health state associated with the satellite ID of the basic information is not true, and sets the satellite ID for the third through tenth words of the subframe to indicate almanac data of the basic information if the health state associated with the satellite ID of the basic information is true.

6. The apparatus of claim 3, wherein the word generator generates the third through tenth words by establishing estimable bits of the third through tenth words by using the basic information, if the subframe is decided to be an ionospheric subframe for subframe 4 of page 18, an anti-spoof subframe for subframe 4 of page 25, or a health state subframe for subframe 5 of page 25 according to the subframe number and the page number.

7. The apparatus of claim 3, wherein the word generator generates the third through tenth words by establishing unestimable bits of the third through tenth words to a predetermined value or a random value, if the subframe is decided to be subframe 4 of pages 1, 6, 11 through 17, and 19 through 24 according to the subframe number and the page number.

8. The apparatus of claim 1, wherein the second baseband processor comprises:

a carrier numerically controlled oscillator (NCO) for generating a carrier frequency signal in synchronization to the system time;

a mixer for mixing the second RF signal with the carrier frequency signal and outputting a baseband signal;

a code NCO for generating a code frequency signal in synchronization to the system time;

a code generator for generating the PRN code of the GPS satellite according to the code frequency signal; and a correlation and coherent integration unit for correlating the baseband signal with the PRN code, integrating the correlation result for a coherent integration time determined by the length of a reliable part of the SA data, and outputting integrated samples to the signal detector.

9. The apparatus of claim 1, wherein the signal detector comprises:

a memory for storing the integrated samples received from the second baseband processor;

a peak detector for detecting samples having peak energy among the stored integrated samples;

a pseudo-range measurer for measuring a pseudo-range to the GPS satellite using the detected samples; and a position solution calculator for calculating the position solution of the mobile terminal using the pseudo-range and pseudo-ranges to other GPS satellites.

10. A method of receiving global positioning system (GPS) signals in a mobile terminal, comprising the steps of:

receiving at a first radio frequency (RF) receiver a first RF signal comprising basic information about a GPS satellite over a mobile communication network;

acquiring the basic information and system time of the mobile communication network based on the output of the first RF receiver;

receiving a second RF signal comprising navigation data from the GPS satellite;

generating sensitivity assistance (SA) data by using the basic information and the system time, the SA data being a replica of the total information bits of the navigation data;

generating integrated samples by correlating a pseudo-random noise (PRN) code with the second RF signal and coherent-integrating the correlation result by using the SA data; and calculating a position solution of the mobile terminal by using the integrated samples.

11. The method of claim 10, wherein the basic information comprises ephemeris data and almanac data.

12. The method of claim 10, wherein the SA data generation step comprises the steps of:
generating a telemetry (TLM) word comprising telemetry information by using the system time;
generating first parity bits by parity-encoding the TLM word and attaching the first parity bits to the TLM word, thereby creating a first word;
generating a handover word (HOW) word comprising time of week (TOW) information by using the system time;
generating second parity bits by parity-encoding the HOW word and attaching the second parity bits to the HOW word, thereby creating a second word;
calculating a subframe number and a page number for the SA data by using the system time, and determining a subframe according to the subframe number and the page number;
generating third through tenth words for the determined subframe by using the basic information;
generating third through tenth parity bits by parity-encoding the third through tenth words and attaching the third through tenth parity bits to the third through tenth words; and
constructing one frame with the first through tenth words comprising the parity bits in a predetermined format.

13. The method of claim 12, wherein the third through tenth words generation step comprises the step of:
generating the third through tenth words by establishing estimable bits of the third through tenth words by using the basic information, if the subframe is decided to be a ephemeris subframe for subframe 1 through subframe 3 according to the subframe number and the page number.

14. The method of claim 12, wherein the third through tenth words generation step comprises the steps of:
if the subframe is decided to be an almanac subframe for subframe 5 of page 1 through page 24 according to the subframe number and the page number, determining satellite identifiers (IDs) according to the relationship between the subframe number and the page number;
establishing a satellite ID for the third through tenth words of the sub frame to indicate a dummy space vehicle (SV) if the health state associated with the satellite ID of the basic information is not true; and
establishing the satellite ID for the third through tenth words of the subframe to indicate almanac data of the basic information if the health state associated with the satellite ID of the basic information is true.

15. The method of claim 12, wherein the third through tenth words generation step comprises the step of:
generating the third through tenth words by establishing estimable bits of the third through tenth words using the basic information, if the subframe is decided to be an ionospheric subframe for subframe 4 of page 18, an anti-spoof subframe for subframe 4 of page 25, or a health state subframe for subframe 5 of page 25 according to the subframe number and the page number.

16. The method of claim 12, wherein the third through tenth words generation step comprises the step of:
generating the third through tenth words by establishing unestimable bits of the third through tenth words to a predetermined value or a random value, if the subframe is decided to be subframe 4 of pages 1, 6, 11 through 17, and 19 through 24 according to the subframe number and the page number.

17. The method of claim 10, wherein the correlation sample generation step comprises the steps of:
generating a carrier frequency signal in synchronization to the system time;
mixing the second RF signal with the carrier frequency signal and thus outputting a baseband signal;
generating a code frequency signal in synchronization to the system time;
generating the PRN code of the GPS satellite according to the code frequency signal; and
correlating the baseband signal with the PRN code, integrating the correlation result for a coherent integration time determined by the length of a reliable part of the SA data, and outputting the integrated samples.

18. The method of claim 10, wherein the position solution calculation step comprises the steps of:
storing the integrated samples;
detecting samples having peak energy among the stored integrated samples;
measuring a pseudo-range to the GPS satellite by using the detected samples; and
calculating the position solution of the mobile terminal by using the pseudo-range and pseudo-ranges to other GPS satellites.

* * * * *